US012657425B2

(12) United States Patent
Yan et al.

(10) Patent No.: US 12,657,425 B2
(45) Date of Patent: Jun. 16, 2026

(54) DYNAMIC CACHE MANAGEMENT IN BEAM SEARCH

(71) Applicant: Microsoft Technology Licensing, LLC, Redmond, WA (US)

(72) Inventors: Yu Yan, Bellevue, WA (US); Jiusheng Chen, Kirkland, WA (US); Ruofei Zhang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1100 days.

(21) Appl. No.: 17/178,385

(22) Filed: Feb. 18, 2021

(65) Prior Publication Data

US 2022/0100676 A1     Mar. 31, 2022

Related U.S. Application Data

(60) Provisional application No. 63/085,093, filed on Sep. 29, 2020.

(51) Int. Cl.
G06N 3/04          (2023.01)
G06F 40/40          (2020.01)

(52) U.S. Cl.
CPC .............. G06N 3/04 (2013.01); G06F 40/40 (2020.01)

(58) Field of Classification Search
CPC .......... G06N 3/045; G06N 3/08; G06N 3/088; G06N 3/0455; G06N 3/0895; G06N 3/09;

G06N 3/091; G06N 3/092; G06N 3/094; G06N 3/096; G06N 3/098; G06N 3/0985; G06F 40/42; G06F 40/58; G10L 15/063; G10L 25/30
See application file for complete search history.

(56) References Cited

U.S. PATENT DOCUMENTS

| | | | |
|---|---|---|---|
| 12,093,806 B1 * | 9/2024 | Zejda ..................... | G06N 3/045 |
| 2017/0148433 A1 * | 5/2017 | Catanzaro .............. | G10L 15/16 |
| 2020/0097806 A1 * | 3/2020 | Chen ..................... | G06F 9/3877 |

OTHER PUBLICATIONS

Tu et al., "Learning to Remember Translation History with a Continuous Cache," arXiv (2017) (Year: 2017).*

(Continued)

*Primary Examiner* — Kakali Chaki
*Assistant Examiner* — Kevin L. Smith
(74) *Attorney, Agent, or Firm* — Shook, Hardy & Bacon L.L.P.

(57) ABSTRACT

Systems and methods for dynamically modifying a cache associated with a neural network model of a natural language generator are described. In examples, a neural network model employs a beam search algorithm at a decoder when decoding output and generating predicted output candidates. The decoder utilizes caching techniques to improve a speed at which the neural network operations. When an amount of memory utilized by one or more caches of the neural network model is determined to exceed a threshold memory size, a layer-specific portion of a cache associated with a layer of the neural network model is identified. The identified layer-specific portion of the cache can be deleted when the amount of memory utilized by the cache of the neural network model exceeds the threshold memory size. In examples, data in the cache is deduplicated and/or deleted.

20 Claims, 16 Drawing Sheets

(56) References Cited

OTHER PUBLICATIONS

Wang et al., "SuperNeurons: Dynamic GPU Memory Management for Training Deep Neural Networks," arXiv (2018) (Year: 2018).*

Sha et al., "A Neural Network Model for Cache and Memory Prediction of Neural Networks," IEEE (2018) (Year: 2018).*

Choi et al., "Learning-based Dynamic Cache Management in a Cloud," arXiv (2019) (Year: 2019).*

Ippolito et al., "Comparison of Diverse Decoding Methods from Conditional Language Models," arXiv (2019) (Year: 2019).*

Kulikov et al., "Importance of Search and Evaluation Strategies in Neural Dialogue Modeling," arXiv (2019) (Year: 2019).*

Li et al., "Learning Forward Reuse Distance," arXiv (Jul. 31, 2020) (Year: 2020).*

Eckert et al., "Neural Cache: Bit-Serial In-Cache Acceleration of Deep Neural Networks," IEEE (2018) (Year: 2018).*

International Search Report and Written Opinion Issued in PCT Application No. PCT/US21/034691, Mailed Date: Sep. 30, 2021, 17 Pages.

Rhu, et al., "vDNN: Virtualized Deep Neural Networks for Scalable, Memory-Efficient Neural Network Design", In Proceedings of 49th Annual International Symposium on Microarchitecture, Oct. 15, 2016, 13 Pages.

Wang, et al., "SuperNeurons: Dynamic GPU Memory Management for Training Deep Neural Networks", In Repository of arXiv:1801.04380v1, Jan. 13, 2018, 13 Pages.

Wiseman, et al., "Sequence-to-Sequence Learning as Beam-Search Optimization", In Repository of arXiv:1606.02960v1, Jun. 9, 2016, 11 Pages.

First Office Action Received for Chinese Application No. 202180066360.X, mailed on Apr. 23, 2026, 21 pages. (English translation Provided).

Wang, et al., "Superneurons: dynamic GPU memory management for training deep neural networks", In Proceedings of the 23rd ACM SIGPLAN Symposium on Principles and Practice of Parallel Programming, Feb. 2018, pp. 41-53.

Wiseman, et al., "Sequence-to-sequence learning as beam-search optimization", In Proceedings of the 2016 Conference on Empirical Methods in Natural Language Processing-Association for Computational Linguistics, Nov. 1-5, 2016, pp. 1296-1306.

* cited by examiner

| Layer | Cache |
|-------|-------|
| 1 | $A_1 A_2 A_3$ |
| 2 | $B_1 B_2 B_3$ |
| 3 | $C_1 C_2 C_3$ |
| 4 | $D_1 D_2 D_3$ |
| 5 | $E_1 E_2 E_3$ |

| Layer | Cache |
|-------|-------|
| 1 | A' |
| 2 | B' |
| 3 | C' |
| 4 | D' |
| 5 | E' |

START
1102

RECEIVE DATA IN A CACHE
1104

DEDUPLICATE DATA IN THE CACHE BASED ON BEAM SIZE
1106

STORE CACHE HAVING DEDUPLICATED DATA
1108

END
1110

DYNAMIC CACHE MANAGEMENT IN BEAM SEARCH

CROSS-REFERENCE TO RELATED APPLICATIONS

The present disclosure claims priority to U.S. Provisional Patent Application No. 63/085,093 filed Sep. 29, 2020, the disclosure of which is hereby incorporated by reference in its entirety.

BACKGROUND

Sequence-to-sequence generation tasks, such as the generation of article summaries, the generation of image captions, and machine translations, involve the generation of many sequences of symbols. In many instances, an encoder is be trained on a particular vocabulary set. Accordingly, machine learning models have been developed to address these tasks and often operate by generating probability distributions across a given vocabulary of output words. That is, a decoding algorithm samples the probability distributions and generates the most likely sequences of words based on such probability distributions. Decoding the most likely output sequence involves searching through all the possible output sequences based on their likelihood. The size of the vocabulary is often tens or hundreds of thousands of words or even millions of words. Therefore, the search problem is exponential in the length of the output sequence.

Beam search is a search algorithm that explores a vast search space to find the most promising solutions. Unlike a greedy decode algorithm, a beam search algorithm does not only select the most probable token at each predicted step but instead selects the top-k tokens having higher probabilities to consider. Thus, utilizing beam search leads to better results than a greedy search in most cases, which makes beam searching a widely used algorithm in natural language generation (NLG) tasks, such as but not limited to text summarization, language translation, question generation, answering, and paraphrasing, etc., where each task includes varied applications of beam search. Although a beam search algorithm tends to provide better results than a greedy search, beam search is more complex and makes the processing pipeline slow due in part to the computational complexity. While a beam size parameter is used to control the search space, and in most instances, a complexity of the beam search, larger beam sizes yield better results but slow the pipeline linearly when executed in an existing system. Accordingly, a tradeoff exists between accuracy and speed. In general, NLG model generation requires lots of time and uses a large amount of computational resources, which limits the model's impact.

Thus, there is a need to increase beam search speed without losing accuracy. Further, the ability to use the same hardware resources to process more data would be a benefit as well. It is with respect to these and other general considerations that embodiments have been described. Also, although relatively specific problems have been discussed, it should be understood that the embodiments should not be limited to solving the specific problems identified in the background.

SUMMARY

In accordance with examples of the present disclosure, the cache management techniques are employed to control the amount of cache utilized by a decoder in a natural language generation system. In some examples, data in a cache is deduplicated such that a single cache is shared between— each beam candidate in a decoder model. Utilizing a cache that includes deduplicated data conserves memory usage by a decoder, and makes more memory available for batch input processing. In some examples, data in a cache is dynamically adjusted based on an available amount of memory. For example, data in a cache that is associated with a lower layer of the neural network can be dynamically deleted or otherwise overwritten. In some examples, the deleted data in the cache that is associated with the lower layer of the neural network is recomputed when memory is available or becomes available.

The computational efficiency of the model increases when using a larger batch size. Accordingly, one or more tradeoffs in computational efficiency exist when determining an amount of memory available for processing input sequences and an amount of memory available for caching. In some examples, the memory read/write patterns and memory access speeds also affect the amount of memory available for each use. For example, reading and writing to the cache generally require two reads and one write every time the cache is accessed. In some examples, it can be more efficient to recompute results rather than access previously computed and/or previously cached results when considering the effort involved in maintaining the cache.

In accordance with at least one aspect of the present disclosure, systems and methods for dynamically modifying a cache associated with a neural network model of a natural language generator are described. More specifically, a system includes a cache, a processor, and memory, including instructions. The instructions, which, when executed by the processor, cause the processor to: determine that an amount of memory utilized by the cache of a neural network model exceeds a threshold memory size; identify a layer-specific portion of the cache associated with a layer of the neural network model; modify the cache by repurpo sing and discarding data stored in the identified layer-specific portion of the cache when the amount of memory utilized by the cache of the neural network model exceeds the threshold memory size; and decode an encoded input of a natural language generator utilizing a beam search (200) algorithm using the modified cache.

In accordance with at least one aspect of the present disclosure, systems and methods for generating output candidates using a beam search algorithm and utilizing a neural network model of a natural language generator are described. A method includes: receiving an input at an encoder of a neural network model; encoding the input at the encoder of the neural network model; and generating output candidates using a decoder of the neural network model to decode the encoded input utilizing a layer-specific portion of a cache that includes deduplicated data, wherein the decoder: receives data associated with an entry in a layer-specific portion of the cache for a first beam in the beam search algorithm; generates a first output candidate utilizing the entry in the layer-specific portion of the cache; receives the data associated with the entry in the layer-specific portion of the cache for a second beam in the beam search algorithm; and generates a second output candidate utilizing the entry in the layer-specific portion of the cache.

In accordance with at least one aspect of the present disclosure, systems and methods for generating output candidates using a beam search algorithm and utilizing a neural network model of a natural language generator are described. The system includes a cache; a processor; and memory including instructions. The instructions, which when executed by the processor, cause the processor to: receive an input at an encoder of a neural network model; encode the input at the encoder of the neural network model; and generate output candidates using a decoder of the neural network model to decode the encoded input utilizing a layer-specific portion of the cache that includes deduplicated data, wherein the decoder: receives data associated with an entry in a layer-specific portion of the cache for a first beam in the beam search algorithm; generates a first output candidate utilizing the entry in the layer-specific portion of the cache; receives the data associated with the entry in the layer-specific portion of the cache for a second beam in the beam search algorithm; and generates a second output candidate utilizing the entry in the layer-specific portion of the cache.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

FIG. 7 depicts details of a data structure in accordance with examples of the present disclosure.

DETAILED DESCRIPTION

Figure 1:
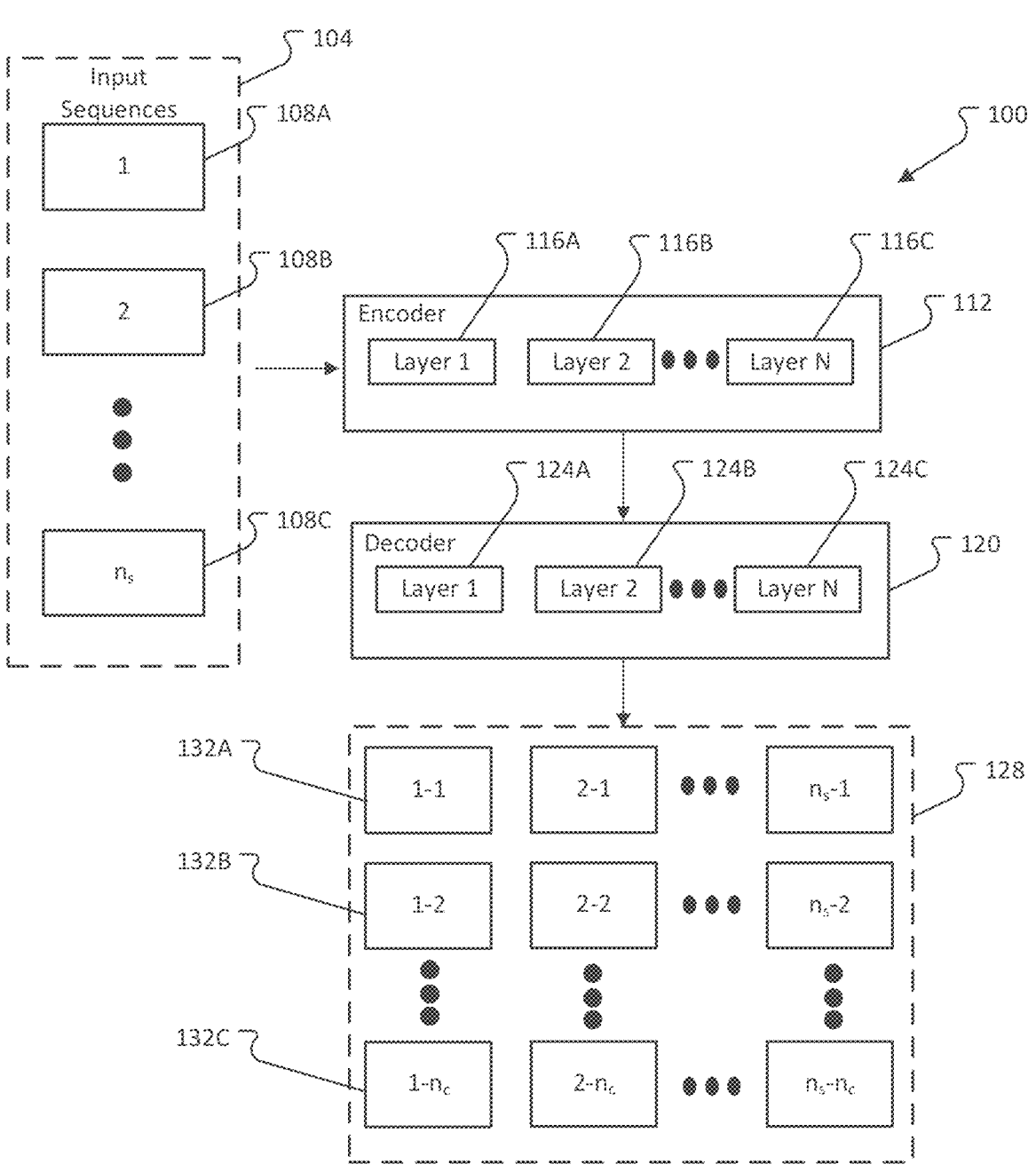
FIG. 1 depicts an example system for generating a language response from an input in accordance with examples of the present disclosure.

In the following detailed description, references are made to the accompanying drawings that form a part hereof, and in which are shown by way of illustrations specific embodiments, or examples. These aspects may be combined, other aspects may be utilized, and structural changes may be made without departing from the present disclosure. Embodiments may be practiced as methods, systems, or devices. Accordingly, embodiments may take the form of a hardware implementation, an entire software implementation, or an implementation combining software and hardware aspects. The following detailed description is therefore not to be taken in a limiting sense, and the scope of the present disclosure is defined by the appended claims and their equivalents.

Natural language generation (NLG) refers to the problem of generating coherent and intelligible text using machine learning concepts, such as neural networks. Example applications include response generation in dialogue, summarization, image captioning, and question answering. For example, a system might take a structured input like an article, chart, or table and generate a concise description. Alternatively, the system might take an unstructured input like a question in text form and generate an output that is the answer to the received query. A natural language generation system makes use of an encoder-decoder model, also referred to as a sequence-to-sequence model, to encode an input, such as an article, chart, or table, and generate a response (also referred to as an output), such as the summarization, caption, or question answering. Different machine learning architectural models can be utilized to generate the response. Non-limiting examples of different machine learning architecture models include, but are not limited to, a recurrent neural network, a convolutional neural network, a Long Short-Term memory (LSTM) neural network, a Gated Recurrent Unit (GRU) neural network, a Transformer, and combinations thereof.

In accordance with examples of the present disclosure, when generating a response, such as an output from a decoder, caching information can speed up a decoding process. As machine learning architecture models become more complex, the amount of cache used by such machine learning architecture models grows to be very large and reduces the computational efficiency of a processor. In examples, read and write access patterns associated with large caches slow down the decoding process. Accordingly, cache management techniques are employed to control the amount of cache used by a decoder in a natural language generation system. While using beam search algorithms tend to require separate cached data for each beam candidate, in examples of the present disclosure, data in a cache is deduplicated such that a single cache, or single version of cached data, is shared between each beam candidate of a neural network in a decoder model. In some examples, a cache size is dynamically adjusted based on an available amount of memory. For example, data in a cache associated with a lower layer of the neural network can be dynamically deleted, or overwritten in the cache to ensure that an amount of memory associated with another operation, such as batch input processing, is continually available. In examples, a flag or addressing index is set to indicate that the data in the cache associated with the lower layer of the neural network is not needed such that the memory blocks are repurposed.

In some examples, the data associated with the removed layer is recomputed when memory is available or becomes available.

FIG. 1 depicts an example system 100 for generating a language response from an input in accordance with examples of the present disclosure. As previously discussed, the sequence-to-sequence like encoder-decoder model, or decoder-only model, converts one sequence of words into another. In an encoder-decoder model, the encoder converts the source sequence of words into a vector in meaning space, and the decoder converts that vector into the target sequence of words. That is, the encoder transforms the input sequence to a single context vector, which forms an intermediate representation of the input or source sequence of words, and the decoder infers a target sequence of words from the intermediate vector, relying on the intermediate vector at every time step throughout the target sequence of the words generation process. In a decoder only model, the decoder both converts the source sequence of words into a vector and then converts that vector into the target sequence of words.

As depicted in FIG. 1, the system 100 includes an encoder 112 and decoder 120; the encoder 112 receives as input one or more input sequences 104. The one or more input sequences 104 correspond to one or more articles 108A, 108B, and/or 108C for example. As another example, the input sequences 104 correspond to one or more sentences for translation, questions for creating question answers, and/or combination of words extracted from or otherwise determined from an image. A batch size refers to the number of input sequences 104 that the encoder 112 and decoder 120 concurrently process. In some examples, a larger batch size is desirable as the encoder 112 and decoder 120 can be more computationally efficient when processing multiple input sequences 104 at a given time. For example, the number of transfer operations transferring input sequences to the encoder can be reduced when a larger batch size is used.

The encoder 112 iteratively integrates words in the input sequence into a hidden state h at each time step and the decoder 120 generates a probability distribution over words to output at each time step. Words are represented as vectors stored in a vocabulary table, where each word in the vocabulary is represented by a vector of a fixed dimension d. As an example, a fixed number of words in a vocabulary, such as 50,000, is used. In other examples, a vocabulary of 60,000 words is used. Based on the number of words in the vocabulary, a vocabulary table is of a size equal to the number of words (e.g., 50,000)×d. In one example, the output from the decoder 120 is generated by multiplying the state h by an output matrix of size [d×50000]. The product is a vector of size 50,000 that can be normalized into a probability distribution over words (or word segments) in the vocabulary. The decoder 120 can then choose the word having the highest probability.

The vectors in the vocabulary table are learned as a part of a separate model training process. For example, during the model training process, input sequences having known target sequences are used to develop the vocabulary. One method for training is to use teacher forcing. Teacher forcing utilizes a relationship between a correctly predicted word and a corresponding pair of sentences. In addition to the vocabulary that is developed during the training, parameters and hyperparameters for the encoder 112 are determined. For example, weights associated with each layer of a neural network are determined and identified during the training process. As one example, weights associated with Layer 1 116A, Layer 2 116B, and Layer N 116C of the encoder 112 are determined, where Layer N represents a last layer or otherwise a layer near the last layer of encoder 112. As another example, weights associated with Layer 1 124A, Layer 2 124B, and Layer N 124C of the decoder 120 are determined, where Layer N represents a last layer or otherwise a layer near the last layer of the decoder 120. A backpropagation algorithm can be utilized to update all of the weights in the network based on a calculated error determined between a correctly predicted word and a corresponding pair of sentences. The weight updates are then propagated back through the decoder 120 layers into the encoder layers and into the vocabulary table.

As further depicted in FIG. 1, the decoder 120 provides a plurality of predicted candidate output sequences 128, where each of the predicted plurality of candidate output sequences, for example predicted candidate 132A, corresponds to a specific input sequence, such as one or more articles 108A. The number of predicted candidate output sequences 128 can be configured according to one or more parameters of the system 100.

In accordance with examples of the present disclosure, the decoder 120 predicts the probability for each word in the vocabulary. The word having the highest predicted probability could be selected and provided to the next decoding step. Thus, at least one goal of the decoder 120 is to pick a sequence of words having the highest overall probability. While computing the probability of every possible sequence is possible utilizing brute force, such an approach using a large vocabulary tends not to be practical. Accordingly, two common approximations that are used include using a greedy search algorithm and a beam search algorithm.

A greedy search algorithm involves picking the most likely token, or word, according to the model at each decoding time step t. However, the greedy search algorithm does not guarantee that the complete output will have the highest overall probability relative to others. For example, an overall better choice may have been to choose a less probable first token, which is more compatible with a second token that provides a higher overall probability of occurrence when the two tokens are considered.

Unlike the greedy search algorithm, a beam search algorithm performs a restricted search over possible sequences to produce a result having a higher overall probability relative to other potential results. For example, at each step of decoding, the B most probable sequences are stored as candidate outputs. The integer B is known as the beamwidth. For each of these selected candidate outputs, a probability is computed for each possible next token, or word, in the vocabulary to produce the new next B most probable sequences. The B most probable sentences are retained and used to generate a probability for the next token or word. As the beamwidth increases, the search becomes more thorough but also more computationally expensive. As a non-limiting example, it is common to see values for a beamwidth in the range of 4 to 200. When the beamwidth is 1, a beam search becomes equivalent to a greedy search.

Figure 2:
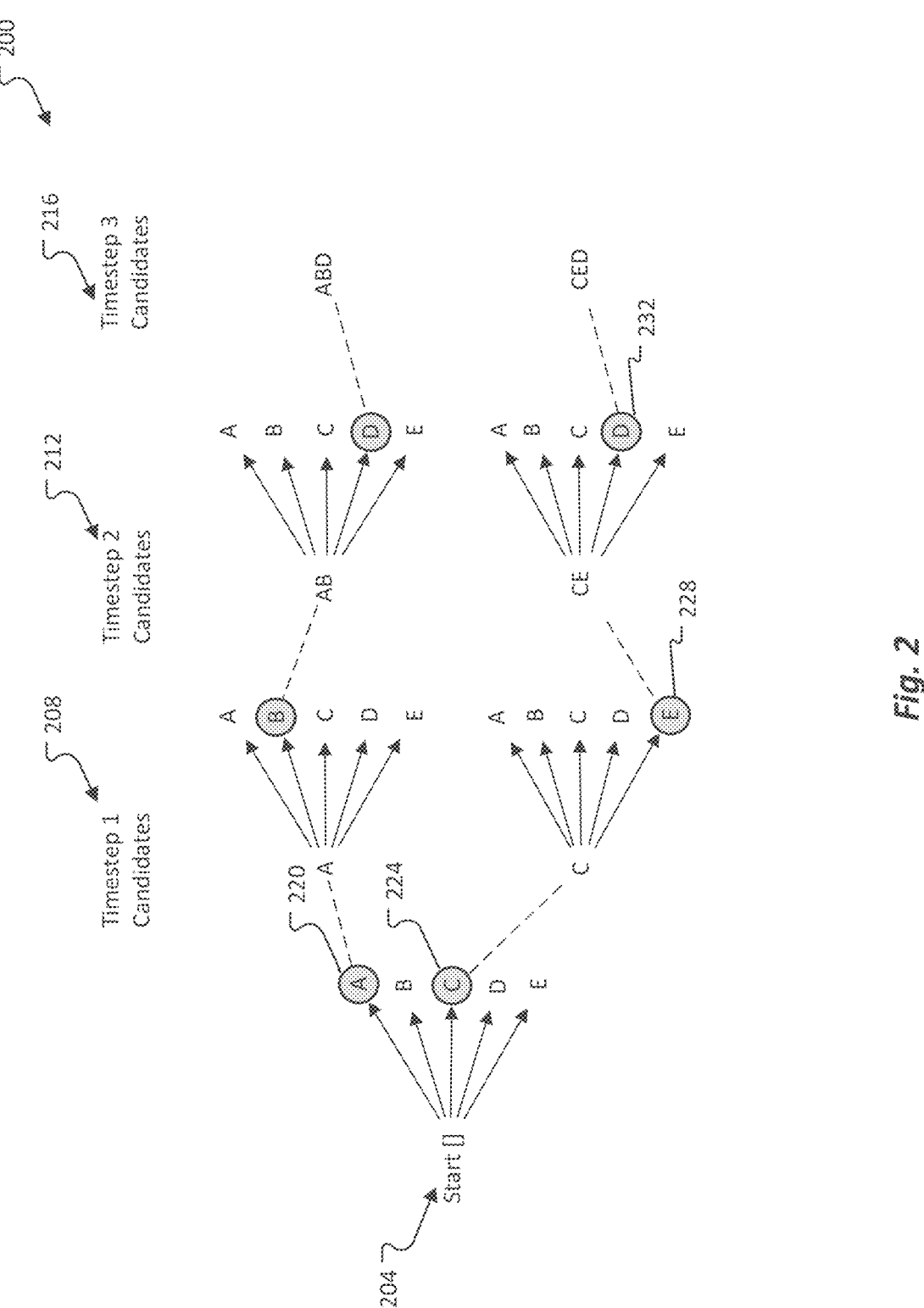
FIG. 2 depicts a beam search tree in accordance with examples of the present disclosure.

A beam search tree 200 is depicted in FIG. 2 in accordance with examples of the present disclosure. A decoding process starts at 204 and determines two words having the highest probability based on the start sequence 204, where the beamwidth is equal to two in this example. As depicted in FIG. 2, candidate A 220 and candidate C 224 are selected as the tokens having the highest probability at the first timestep 208. Accordingly, at the second time step 212, the next two tokens, based on the previously predicted tokens 220 and 224, are predicted. That is, candidates B and E 228 forming sequences AB and CE are selected as having a highest overall probability at the second time step 212. At the third time step, the next two tokens, based on the previously predicted sequences AB and CE, are predicted. That is, candidate D (e.g., candidate D 232) is selected and forms sequences ABD and CED; candidate D is selected as having the highest overall probability at the third time step 216. The search process continues until a determined or desired output is reached, such as a punctuation mark for example. The B output sequences having the greatest overall probability are selected as candidate output sequences, such as the predicted candidate output sequences 128.

Figure 3:
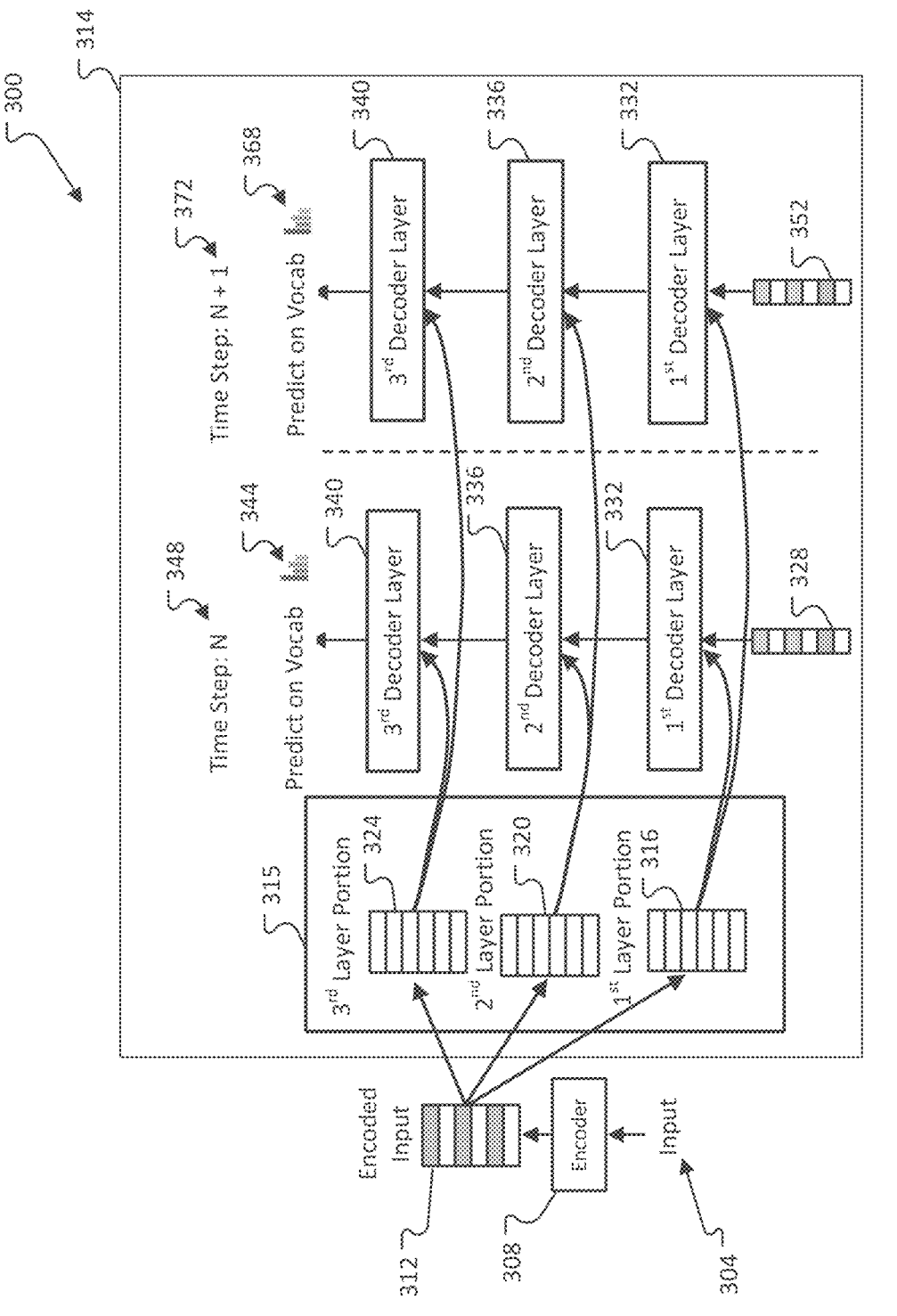
FIG. 3 depicts additional details of a decoding process in accordance with examples of the present disclosure.

FIG. 3 depicts additional details of a decoding process in accordance with examples of the present disclosure. More specifically, an input 304, corresponding to the one or more input sequences 104 is received at a trained encoder 308. The encoder 308 converts the input sequence into an encoded input 312, where the encoded input 312 corresponds to a vector representation of the input 304. As previously discussed, the decoder 314 includes various layers, such as a first decoder layer 332, second decoder layer 336, and third decoder layer 340. At each time step during the prediction process, each layer requires access to a layer-specific portion of the cache 315 that is computed from the encoded input 312. For example, data for the first layer-specific portion 316 of the cache 315 is computed from the encoded input 312 using a weight matrix. Data for the second layer-specific portion 320 of the cache 315 and the third layer-specific portion 324 of the cache 315 use a different weight matrix. Accordingly, a first layer-specific portion 316 of the cache 315, a second layer-specific portion 320 of the cache 315, and a third layer-specific portion 324 of the cache 315 are needed. Of course, a decoder 314 having more layers, such as twelve layers, would require the first layer-specific portion 316 of the cache 315, the second layer-specific portion 320 of the cache 315, and the third layer-specific portion 324 of the cache 315 up through a twelfth layer cache. Each layer-specific portion of the cache is then used at a corresponding decoding layer during a time step. For example, a token 328, such as a word, can be provided to the first decoder layer 332; the first decoder layer 332 accesses the data in the first layer-specific portion 316 of the cache to generate a first set of outputs, which is provided to the second decoder layer 336. The second decoder layer 336 accesses the data in the second layer-specific portion 320 of the cache 315 to generate a second set of outputs, which is then provided to the third decoder layer 340. The third decoder layer 340 accesses the data in the third layer-specific portion 324 of the cache 315 to identify a token, or word, 344 having a highest probability for the time step N 348, such as a first timestep. The token or word 344 is then provided as an input to the decoder as a token 352.

During a second time step to predict a second token, or word, in the predicted output sequence, the token 352, is provided to the first decoder layer 332; the first decoder layer 332 accesses the data in the first layer-specific portion 316 of the cache 315 to generate a first set of outputs which is provided to the second decoder layer 336. The second decoder layer 336 accesses the data in the second layer-specific portion 320 of the cache 315 to generate a second set of outputs which is then provided to the third decoder layer 340. The third decoder layer 340 accesses the data in the third layer-specific portion 324 of the cache 315 to identify a token, or word, 368 having a highest probability for the time step N+1 372. Accordingly, the decoder 314 requires access to the data for the first layer-specific portion 316 of the cache 315, the data for the second layer-specific portion 320 of the cache 315, and the data for the third layer-specific portion 324 of the cache 315 for this example. In some examples, the size of the cache is large and because of the large cache size, can reduce the computational efficiency of a decoding process.

As previously mentioned, the speed at which a natural language generation (NLG) model operates is much slower compared to a natural language understanding (NLU) model. An NLG model typically runs once per generation of a token and may execute many times to provide predicted output candidates. Accordingly, caching is introduced for the reuse of the intermediate result. Though the cache generally increases the speed at which the NLG model may operate, an NLG model that includes a cache has a very different computation/IO pattern when compared to an NLU model, and in some examples, a large cache reduces the speed at which the NLG model operates due in part to the computation/IO patterns.

Figure 4:
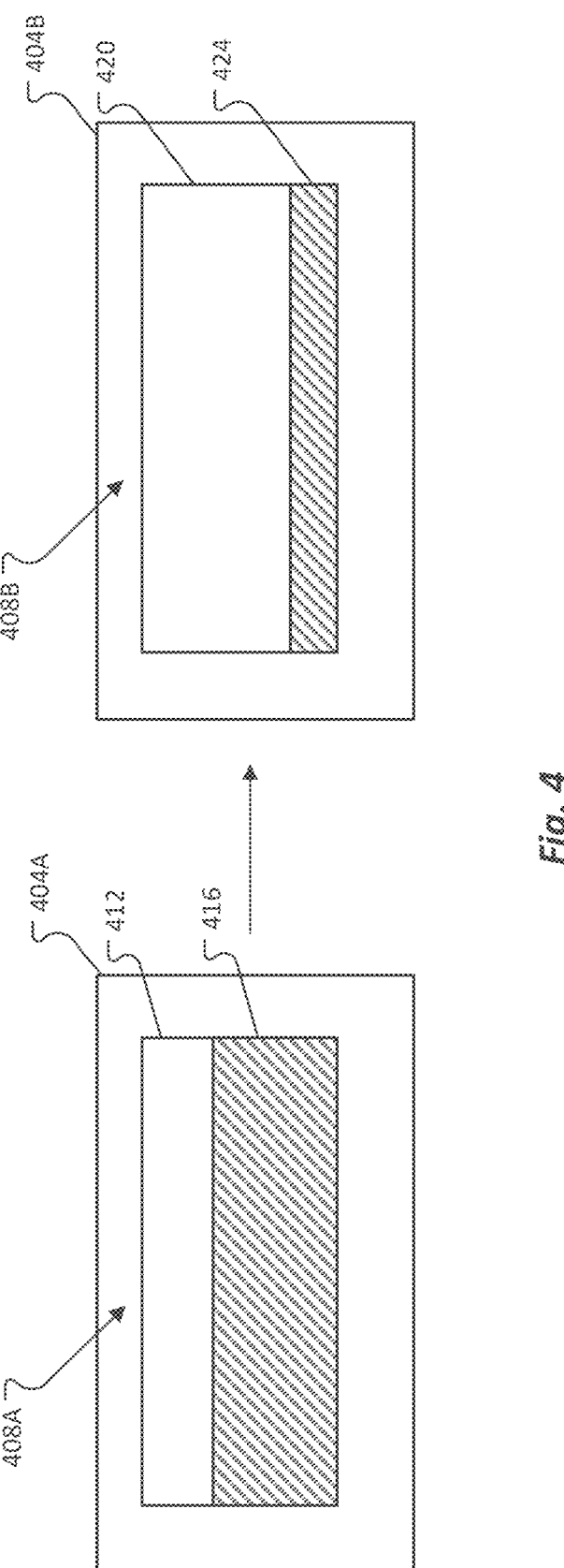
FIG. 4 depicts details of a graphical processing unit in accordance with examples of the present disclosure.

FIG. 4 depicts details of an example graphical processing unit (GPU) in accordance with examples of the present disclosure. The GPU 404A includes memory 408A. The memory 408A includes space for one or more caches utilized by the decoder. For example, the memory 408A stores data for the first layer-specific portion 316 of the cache 315, data for the second layer-specific portion 320 of the cache 345, and data for the third layer-specific portion 324 of the cache 315 (from FIG. 3). The memory 408A also stores the intermediate outputs for each time step provided by the first decoder layer 332, the second decoder layer 336, and the third decoder layer 340 (from FIG. 3). In accordance with examples of the present disclosure, a designated amount of memory 412 is provided for processing several input sequences 104 as determined by a batch size parameter. In addition, a designated amount of memory 416 is provided for the layer-specific portions of the cache, such as 316, 320, and 324. As previously mentioned, the computational efficiency of the model may increase when using a larger batch size. Accordingly, one or more tradeoffs in computational efficiency exist when determining the amount of memory available for processing input sequences and the amount of memory available for caching. In some examples, the memory read/write patterns and memory access speeds also affect the amount of memory available for each use. For example, reading data from a cache and writing data to the cache may require two reads and one write every time the cache is accessed. In some examples, it is more efficient to compute results rather than access previously computed and/or previously cached results.

In accordance with examples of the present disclosure, the amount of memory needed for caching data can be reduced by utilizing deduplication techniques applied to data in the cache and/or by determining data within the cache that is more efficient to compute than to access via the cache. For example, a GPU 404B includes a memory 408B. One or more portions of the memory 408B are dynamically managed such that an amount of memory 424 allotted for the cache, and in some instances, the layer-specific portions of the cache 315 (e.g., 316, 320, and 324 of FIG. 3), is smaller than a designated amount of memory 416. By reducing the amount of memory allotted to the cache, the designated amount of memory 420 can be increased. Thus, the designated amount of memory 420 can be larger than the designated amount of memory 412.

Figure 5:
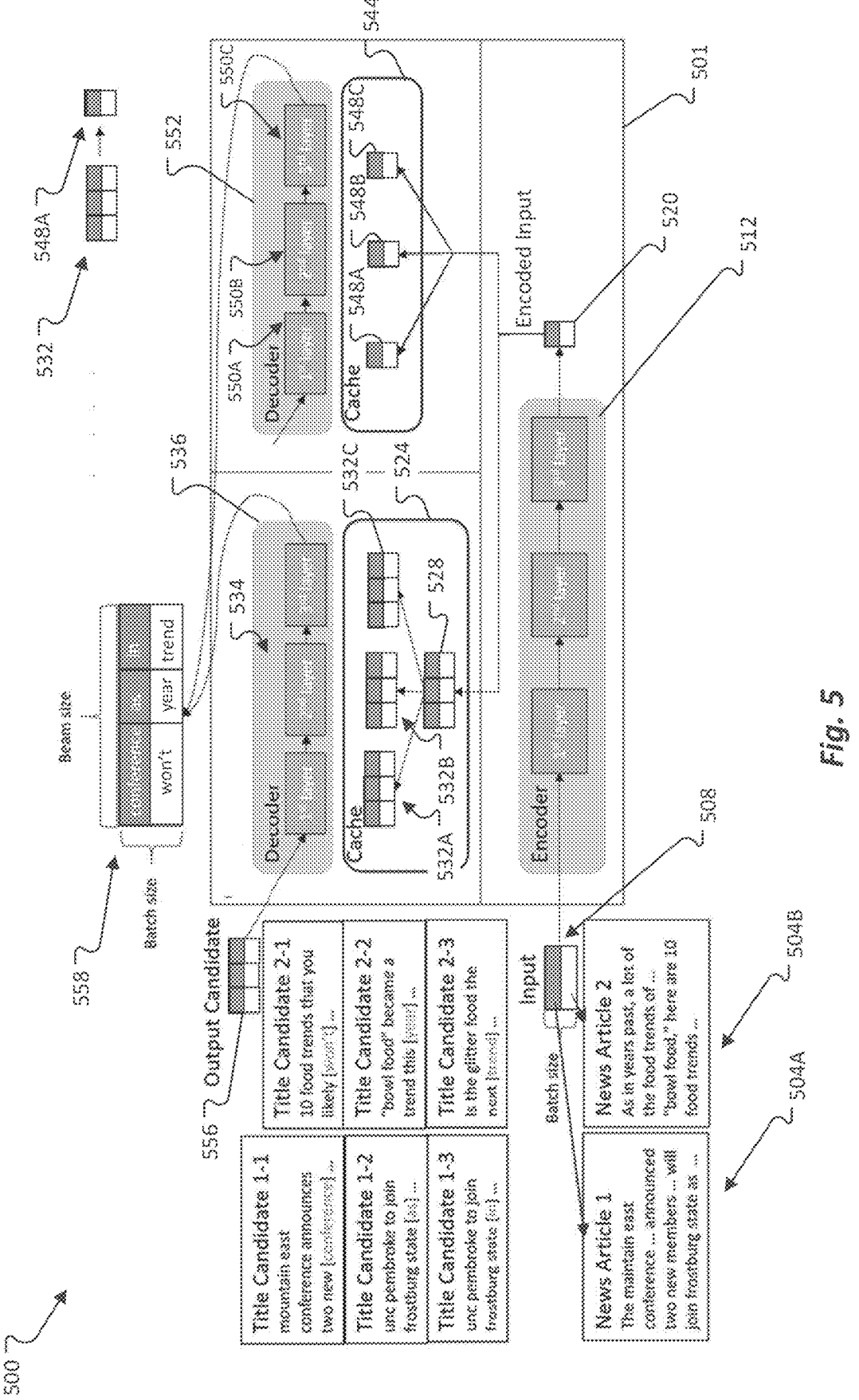
FIG. 5 depicts details of a block diagram directed to example caching models in accordance with examples of the present disclosure.

FIG. 5 depicts example caching models 500 in accordance with examples of the present disclosure. As depicted in FIG. 5, an input 508 comprising a plurality of input sequences 504A and 504B is provided to the encoder 512 of a neural network model 501. The batch size of the input 508 is determined by the number of input sequences that can be processed at any one time. As a non-limiting example, the batch size depicted in FIG. 5 is two. The encoder 512 encodes the input 508 utilizing the first layer, second layer, and third layers as previously discussed. Of course, additional or fewer layers can be included in the encoder 512. The encoder 512 generates the encoded input 520 to be provided to the decoder 536 or 552. In some examples, the decoder 536 includes a total cache 524; the total cache includes a global cache 528, and respective layer-specific portions 532A-C of the cache 524 corresponding to each of the layers 534 of the decoder 536 and each beam of the beam search. Accordingly, three separate layer-specific portions 532A-C of the cache 524 and a global cache 528 are utilized by the decoder 536 to generate output candidates 556.

In accordance with examples of the present disclosure, the encoder 512 generates the encoded input 520 to be provided to the decoder 552. The decoder 552 includes a total cache 544; the total cache 544 includes layer-specific portions 548A, 548B, and 548C; each layer-specific portion 548A, 548B, and 548C includes deduplicated data corresponding to respective layers 550A, 550B, and 550C of the decoder 552. The decoder 552 generates predicted output candidates 558 utilizing the total cache 544, where the predicted result at each time step is predicted using a beam search process as previously discussed. Accordingly, rather than requiring four caches (e.g., one global cache 528 and three layer-specific portions 532A-C), only three layer-specific portions 548A-C with deduplicated data are required by the decoder 552.

When comparing each of the layer-specific portions 548A-C to respective layer-specific portion 532A-C, each of the layer-specific portions 548A, 548B, and/or 548C has a size equal to 1/beam size of the respective layer-specific cache portions 532A-C. Thus, for example, data in a layer-specific portion 532A corresponding to each beam of the beam search is deduplicated, resulting in a smaller layer-specific portion 548A. Thus, the layer-specific portion 548A is specific to a single beam of the beam search. That is, the beam-specific portion of the cache 544 associated with a layer is less than a beamwidth employed by the beam search.

In examples, the layer-specific portion with deduplicated data is specific to a layer of the decoder. That is, data in a layer-specific portion 532A is deduplicated, resulting in a smaller layer-specific portion 548A. The size of the layer-specific portion 548A with deduplicated data is equal to the batch size*the input length*the model hidden dimension*the byte size*the model layer; the size of the layer-specific portion 548B with deduplicated data is equal to the batch size*the input length*the model hidden dimension*the byte size*the model layer; the size of the layer-specific portion 548C with deduplicated data is equal to the batch size*the input length*the model hidden dimension*the byte size*the model layer. As an example, having a batch size configuration setting of 128, a beam size configuration setting of 4, an input length of 1024, and an output length of 100, the cache required by the bidirectional and auto-regressive transformers (BART) model can be reduced from 27.4 GB to 8.65 GB.

Figure 6:
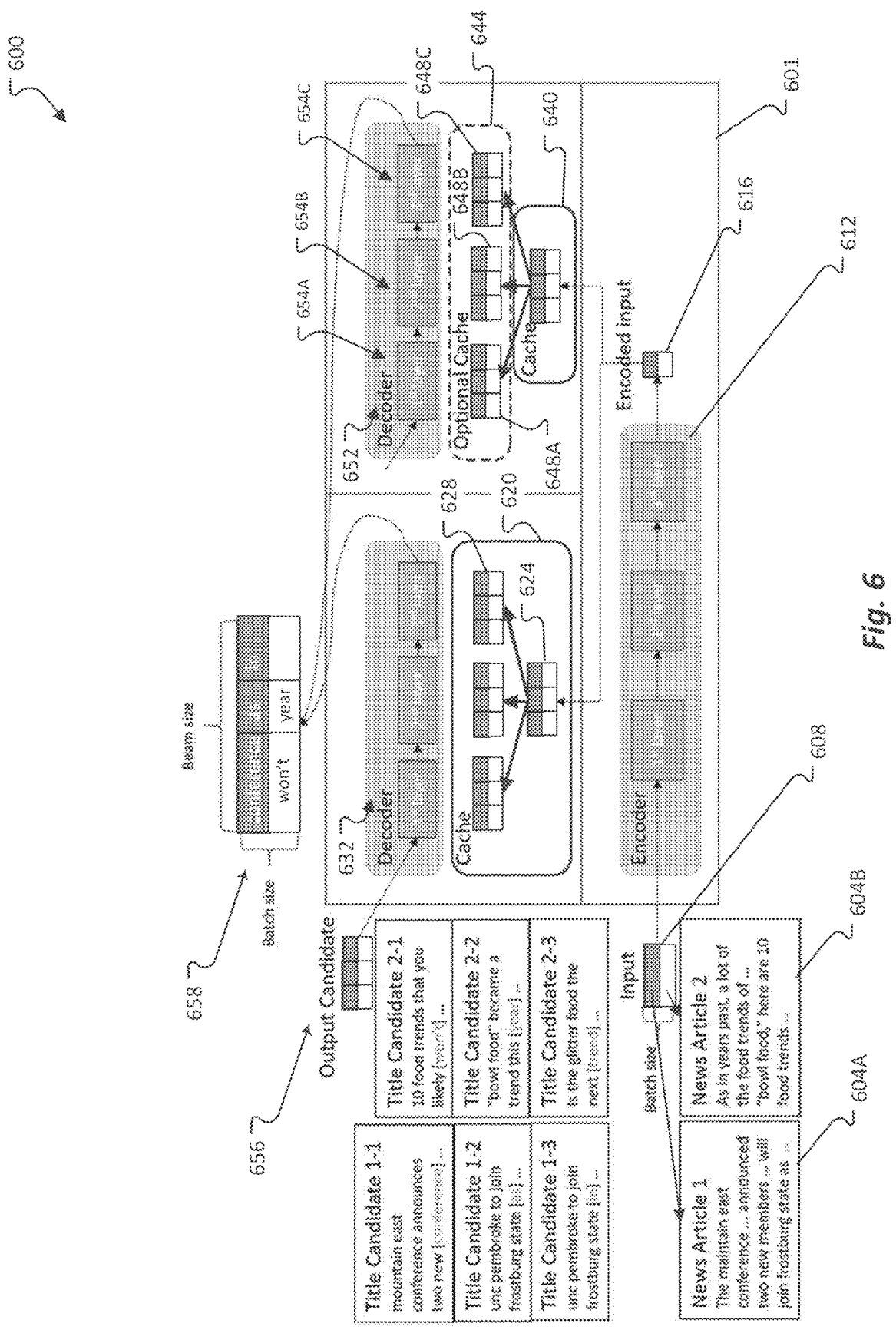
FIG. 6 depicts details of a block diagram directed to reducing and/or dynamically managing a cache allotment in accordance with examples of the present disclosure.

FIG. 6 depicts details of a method 600 for reducing and/or dynamically managing a size of a cache in accordance with examples of the present disclosure. An input 608 comprising a plurality of input sequences 604A and 604B are provided to the encoder 612 of a neural network model 601. The batch size of the input 608 is determined by the number of input sequences that can be processed at any one time. As a non-limiting example, the batch size depicted in FIG. 6 is two. The encoder encodes the input 608 utilizing the first layer, second layer, and third layers as previously discussed. Of course, additional or fewer layers may be included in the encoder 612. The encoder 612 generates the encoded input 616 to be provided to the decoder 632 or 652. In some examples, a cache 620 of the decoder 632 is utilized where the total cache 620 includes a global cache 624 and layer-specific portions 628 corresponding to each of the respective layers in the decoder 632. Accordingly, three separate layer-specific portions 628 and the global cache 624 are utilized to generate output candidates 656.

In accordance with examples of the present disclosure, the encoder 612 generates the encoded input 616 to be provided to the decoder 652. The decoder 652 includes a global cache 640 and, based upon an available amount of memory, generates data in optional cache portion 644, where the data in the optional cache portion 644 can be hierarchically generated and corresponds to each of the layers in the decoder 652. For example, a global cache 640 is used to generate data for a layer-specific portion 648A of the cache 644 corresponding to the first layer 654A of the decoder 652. The global cache 640 is used to generate data for a layer-specific portion 648B of the cache 644 corresponding to the second layer 654B of the decoder 652. The global cache 640 is used to generate data for a layer-specific portion 648C corresponding to the third layer 654C of the decoder 652. In some examples, a cache monitor monitors an amount of available memory and indicates that the data for the optional layer-specific portions 648A, 648B, and 648C of the cache 644 can be generated in a hierarchically manner. For example, data for a first layer-specific portion 648A of the cache 644 can be generated before data for a second layer-specific portion 648B of the cache 644. In some examples, if an amount of available memory increases above a threshold value, the cache monitor can remove or mark as deleted data in the layer-specific portions of the cache 644 in a reverse-hierarchical manner to ensure that an amount of memory associated with another operation, such as batch input processing, is continually available. In examples, a flag or addressing index is set to indicate that the data in the cache is not needed such that the memory blocks can be repurposed. For example, data in the lowest layer-specific portion of the cache 644 (e.g., third layer-specific portion 648C of the cache 644) can be removed first, followed by the data in the second layer-specific portion 648B of the cache 644 and the data in the first layer-specific portion 648A of the cache 644. That is, the data for the optional layer-specific portions 648A-648C of the cache 644 is generated and/or the data in the optional layer-specific portions 648A-648C of the cache 644 is deleted based on an amount of available memory. The optional layer-specific portions 648A-648C of the cache 644 and the global cache 640 are utilized to generate output candidates 658.

Because the beam search process is complex, the size of the cache may dramatically increase in size at a beginning stage, and gradually grow until a maximum cache size is reached. The cache growth is dependent on both the data and the model employed. A batch size can be selected to guarantee that an amount of memory is available to store the data and to sub-optimally utilize the memory by creating and deleting the optional layer-specific portions of the cache as needed. Thus, automatically adjusting the data in the layer-specific portions of the cache leverages a hierarchical computation process to dynamically control cache size and re-computation cost. As one example, the minimal cache requirement is reduced from 8.65 GB to 2.7 GB while minimally impacting computationally efficiency. Accordingly, a much larger batch size can be selected to increase the computational efficiency related to the processing of the dataset as a whole.

Table 1 provides an example efficiency analysis in accordance with examples of the present disclosure.

| Encoder-Decoder Block in Transformer | | | |
|---|---|---|---|
| | Implementation | Memory Read/Write size | Cache Size |
| Baseline | Standard transformer | $3^{\#}$ * (B1 * B2 * S * H * b) * L<br>**3\*5** * (B1 * S * H * b) * L | B1 * B2 * S * H * b * L<br>5 * B1 * S * H * b * l2 |
| FIG. 5 | Cache deduplication | 1 * (B1 * S * H * b) * L | 1 * B1 * S * H * b * L<br>1 * B1 * S * H * b * l2 |
| FIG. 6 | Automatic cache adjustment | Maximum: 3 * (B1 * S * H * b) * L<br>Minimum: 1 * (B1 * S * H * b) * L | Maximum: B1 * S * H * b * (L + 1)<br>Minimum: B1 * S * H * b * l |

As provided in Table 1, the bold numbers/variables indicate those parameters that can be altered utilizing one or more deduplication techniques, such as those described with respect to FIG. 5. The italicized numbers/variables indicate those parameters that can be altered by dynamically controlling the size of the cache, such as described with respect to FIG. 6. B1 is equal to the batch size, S is equal to the input length, H is equal to the number of model hidden dimensions, b is equal to the byte size, and L is equal to the model layer. B2 is equal to a beam size, where a beam size of five is commonly chosen for NLG models, such as transformer and/or LSTM models, etc. L is equal to the model layer and is, in examples, equal to twelve as in the BART or Prophet Net model. To read and write to the cache, two reads and one write are generally needed (cache reordering requires one read and one write operation, and another read to consume data from the cache).

FIG. 7 depicts example tables storing locations associated with layer-specific portions of the cache associated with model layers in accordance with examples of the present disclosure. More specifically, the table 704 includes a layer field 708 and a layer-specific portion field 712, where the layer-specific portion field 712 corresponds to a location of a layer-specific portion cache in the cache, such as but not limited to an address, offset, pointer, etc., that is associated with a specific layer of a decoder model. For example, where a beamwidth is equal to three, three layer-specific portions $A_1A_2A_3$ of a cache are referenced, where each of the layer-specific portions references a different location in a cache. The table 716 includes locations of layer-specific portions of the cache having deduplicated data. For example, each layer in the layer field 720 is associated with a layer-specific portion field 724 corresponding to a location of a layer-specific portion of the cache with deduplicated data as indicated by the value of cache "A," "B," "C," "D," and "E'" in the layer-specific portion field 724. Accordingly, a decoder accesses the layer-specific portions of the cache with deduplicated data by referring to the layer-specific portion field 724.

Figure 8:
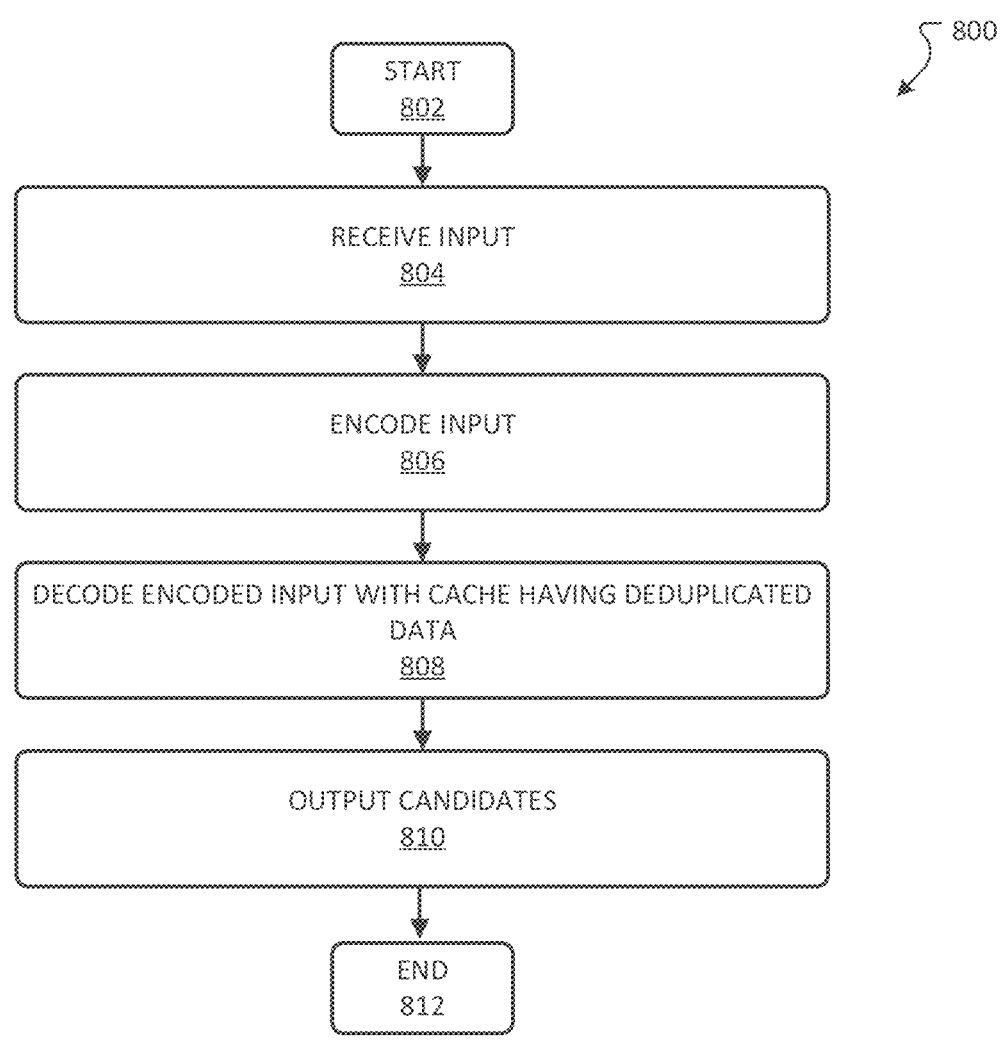
FIG. 8 depicts details of a method for generating or otherwise obtaining predicted candidate sequences from example input sequences utilizing a deduplicated cache in accordance with examples of the present disclosure.

FIG. 8 illustrates an overview of an example method 800 for generating or otherwise obtaining predicted candidate sequences from example input sequences in accordance with examples of the present disclosure. A general order for the steps of the method 800 is shown in FIG. 8. Generally, the method 800 starts at 802 and ends at 812. The method 800 may include more or fewer steps or may arrange the order of the steps differently than those shown in FIG. 8. The method 800 can be executed as a set of computer-executable instructions executed by a computer system and encoded or stored on a computer-readable medium. Further, the method

800 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 800 shall be explained with reference to the systems, components, modules, software, data structures, user interfaces, etc., described in conjunction with FIGS. 1-7.

The method 800 begins at operation 802 and transitions to 804, where a trained encoder model, such as the encoder 112, 308, 512, and/or 612 receives one or more input sequences for generating predicted candidate output sequences. The one or more input sequences correspond to the one or more input sequences 104 as previously discussed. The method 800 transitions to 806 to encode the one or more input sequences. The encoded input is then provided to the decoder at 808, where the decoder generates one or more predicted candidate outputs utilizing a cache that includes deduplicated data as described with respect to FIG. 5. For example, the decoder references a layer-specific portion field referring to a location of the layer-specific portions of the cache with deduplicated data. The method 800 then outputs predicted candidates at 810 utilizing the cache that includes deduplicated data and ends at 812.

Figure 9:
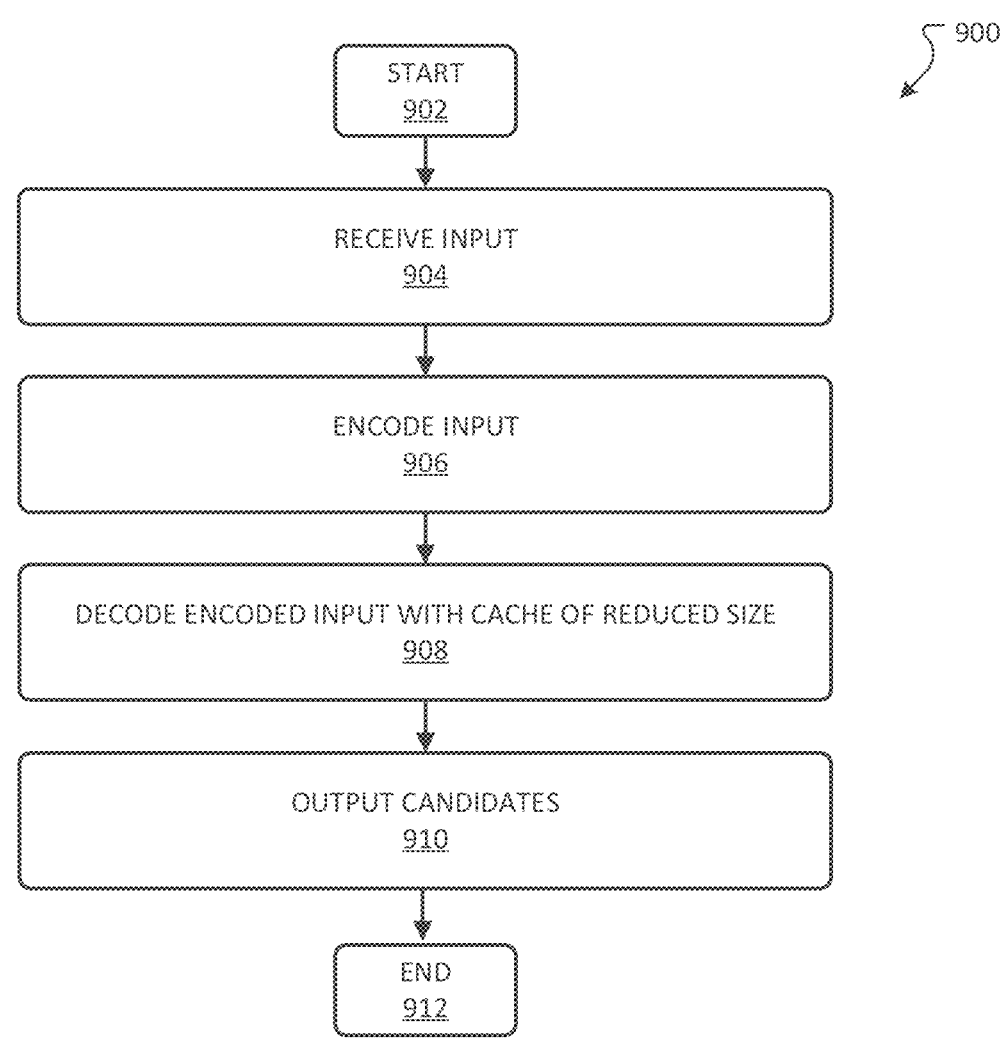
FIG. 9 depicts details of a method for generating or otherwise obtaining predicted candidate sequences from example input sequences using a dynamically adjusted cache in accordance with examples of the present disclosure.

FIG. 9 illustrates an overview of an example method 900 for generating or otherwise obtaining predicted candidate sequences from example input sequences in accordance with examples of the present disclosure. A general order for the steps of the method 900 is shown in FIG. 9. Generally, the method 900 starts at 902 and ends at 912. The method 900 may include more or fewer steps or may arrange the order of the steps differently than those shown in FIG. 9. The method 900 can be executed as a set of computer-executable instructions executed by a computer system and encoded or stored on a computer-readable medium. Further, the method 900 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 900 shall be explained with reference to the systems, components, modules, software, data structures, user interfaces, etc., described in conjunction with FIGS. 1-8.

The method 900 begins at operation 902 and transitions to 904 where a trained encoder model, such as the encoder 112, 308, 512, and/or 612, receives one or more input sequences for generating predicted candidate output sequences. The one or more input sequences correspond to the one or more input sequences 104 as previously discussed. Accordingly, the method 900 transitions to 906 to encode the one or more input sequences. The encoded input is then provided to the decoder at 908, where the decoder generates one or more predicted candidate outputs utilizing a cache as described with respect to FIG. 6.

For example, the decoder includes a total cache. Based upon an available amount of memory, it generates data for optional layer-specific portions of a cache. The data for the optional layer-specific portion of the cache is hierarchically generated and corresponds to one or more layers in the decoder. A global cache is used to generate data for a first layer-specific portion of the cache for the first layer of the decoder; the global cache is used to generate data for a second layer-specific portion of the cache for the second layer of the decoder; and, the global cache is used to generate data for a third layer-specific portion of the cache for the third layer of the decoder. In some examples, a cache monitor monitors an amount of available memory and indicates that the data for the optional layer-specific portions of the cache can be generated in a hierarchical manner. In some examples, if an amount of available memory drops below a threshold, the cache monitor removes or marks as deleted the data in the layer-specific portions of the cache in a reverse-hierarchical manner to ensure that an amount of memory associated with another operation, such as batch input processing, is continually available. In examples, a flag or addressing index is set to indicate that the data in the cache associated with a lower layer of the neural network is not needed such that the memory blocks can be repurposed. For example, the data in the lowest layer-specific portion of the cache (e.g., a portion of the cache associated with the last layer or approximately last layer of the decoder) can be removed first, followed by the data in the layer-specific portion of the cache associated with the next layer, and then the data in the layer-specific portion of the cache associated with the following layer. That is, the data in the optional layer-specific portions of the cache can be created or deleted based on the amount of available memory. Example cache sizing can occur in accordance with previously described Table 1. In examples, the threshold value associated with generating layer-specific portions of a cache may be the same or different from the threshold value associated with removing or marking for deletion the data in the layer-specific portions of the cache. The method 900 then outputs predicted candidates at 910 and ends at 912.

Figure 10:
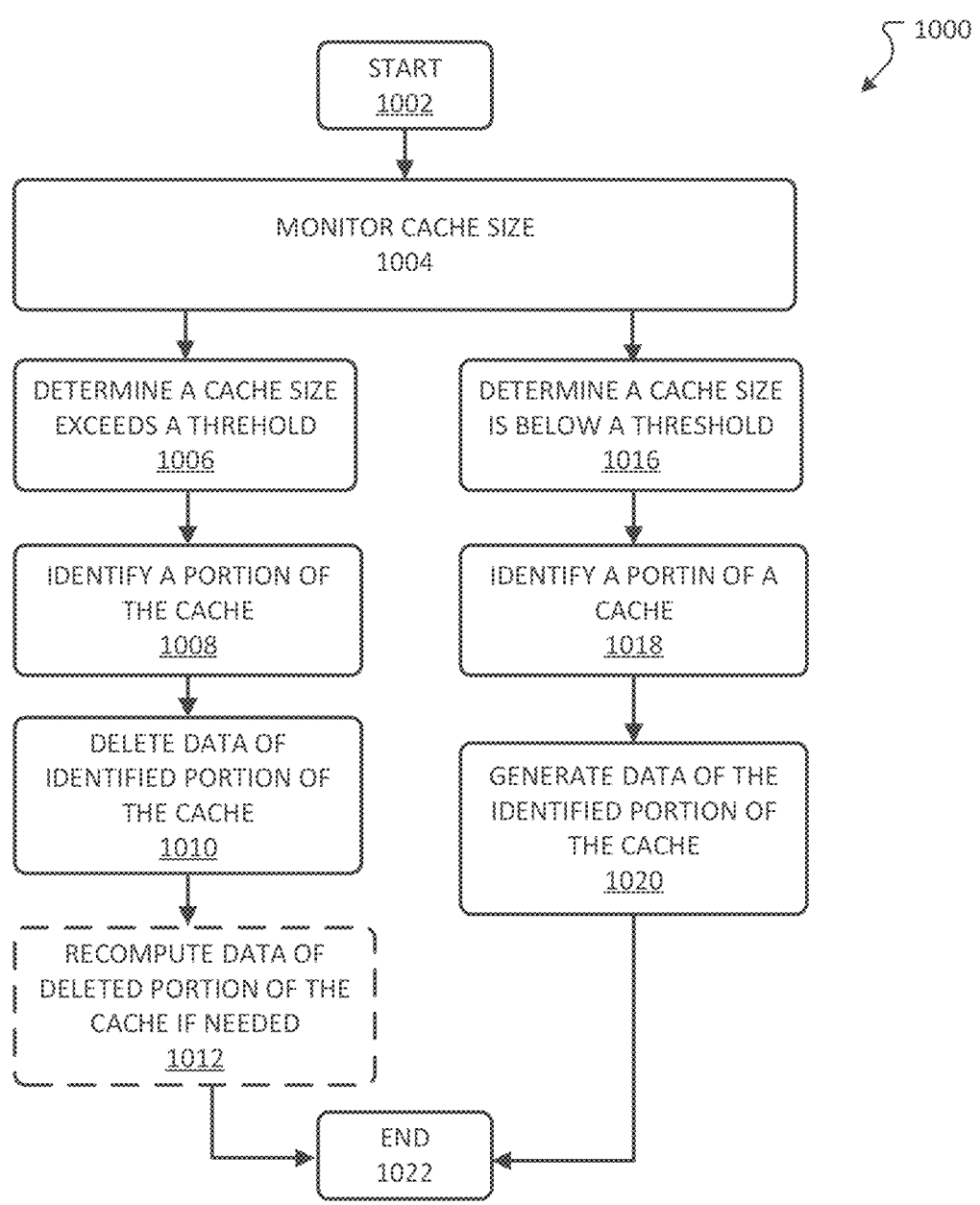
FIG. 10 depicts details of a method for dynamically adjusting a cache size in accordance with examples of the present disclosure.

FIG. 10 illustrates an overview of an example method 1000 for dynamically adjusting a cache size in accordance with examples of the present disclosure. A general order for the steps of the method 1000 is shown in FIG. 10. Generally, the method 1000 starts at 1002 and ends at 1016. The method 1000 may include more or fewer steps or may arrange the order of the steps differently than those shown in FIG. 10. The method 1000 can be executed as a set of computer-executable instructions executed by a computer system and encoded or stored on a computer-readable medium. Further, the method 1000 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 1000 shall be explained with reference to the systems, components, modules, software, data structures, user interfaces, etc., described in conjunction with FIGS. 1-9.

The method 1000 begins at operation 1002, where a size of an existing cache is monitored by a cache monitor. The size of the cache refers to a size of a neural network model layer-specific cache, and may include but is not limited to an amount of memory utilized by a first layer-specific portion of the cache or an amount of memory utilized by a second layer-specific portion of the cache, etc. In some examples, the size of the cache refers to the total amount of memory utilized by the neural network model. For example, a size of the cache refers to an amount of memory corresponding to the designated amount of memory 424 (FIG. 4) utilized by the neural network model and may refer to the amount of memory used by the layer-specific portions of the cache. The method 1000 proceeds to one or both of 1006 and/or 1014. At 1006, a cache monitor determines if the size of the cache exceeds a threshold. The threshold can be a static threshold or can be a dynamic threshold and refers to an amount of memory. The threshold may be based on a batch size and the amount of memory available after taking into account memory usage associated with the batch size. In some examples, the threshold is equal to the designated amount of memory 424 (FIG. 4) or a percentage (e.g., 90%, 100%, 110%) of the designated amount of memory 424.

If the cache size exceeds the threshold at 1006, a layer-specific portion of a cache, or data of the layer-specific portion of the cache, is identified at 1008. For example, a lowest or lower-level portion of the cache of the neural network model is identified. In some examples, the lowest or lower-level portion of the cache may not refer to the lowest layer of the neural network model. For example, where a layer-specific portion of the cache, or data of the layer-specific portion of the cache, associated with a first layer of the decoder has already been removed, the identified layer-specific portion of the cache refers to a layer-specific portion of the cache, or data of the layer-specific portion of the cache, associated with a second layer of the neural network model. At 1010, the data in the identified layer-specific portion of the cache is deleted as previously described with respect to FIG. 6. In some examples, the data in the identified layer-specific portion of the cache is deduplicated by removing at least a portion of the data within the cache as previously described with respect to FIG. 5. The method 1000 proceeds to 1012 and recomputes data/values associated with a lower network layer on an as-needed basis.

In some examples, the method 1000 proceeds to 1014, where a cache monitor monitors a size of a cache and determines that memory is available and that data for a layer-specific portion of the cache can be generated. For example, the method 1000 determines that the size of the data in a cache is less than a threshold. As previously described, the threshold can be a static threshold or can be a dynamic threshold and refers to an amount of memory. The threshold can be based on a batch size and the amount of memory that is available after taking into account memory usage associated with the batch size. In some examples, the threshold is equal to the designated amount of memory 424 (FIG. 4) or a percentage (e.g., 90%, 100%, 110%) of the designated amount of memory 424. Accordingly, the method 1000 proceeds to 1018, where a layer-specific portion of the cache is identified. That is, a network layer that does not have data in the cache is identified. For example, a third network layer that is not associated with cached data is identified, whereas a second network layer that is associated with cached data (e.g., a second layer-specific portion) would not be identified. At 1020, data to be added to the cache for the lowest network layer is generated or otherwise computed and stored as a layer-specific portion of the cache. In some examples, the data that is generated or otherwise computed is deduplicated data. Alternatively, or in addition, data for a layer-specific portion of the cache corresponding to each beam of the beam search is generated, previously described with respect to FIG. 6. The method 1000 ends at 1022.

Figure 11:
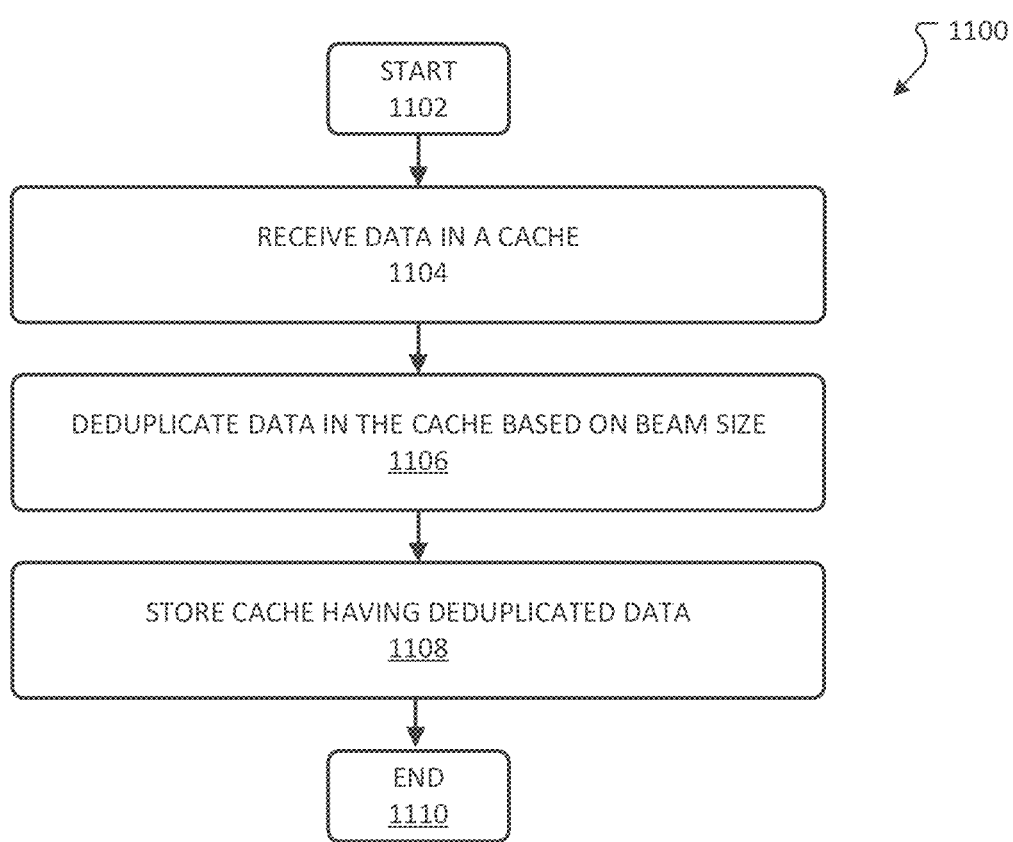
FIG. 11 depicts details of a first method for deduplicating data in a cache in accordance with examples of the present disclosure.

FIG. 11 illustrates an overview of an example method 1100 for deduplicating data in a cache in accordance with examples of the present disclosure. A general order for the steps of the method 1100 is shown in FIG. 11. Generally, the method 1100 starts at 1102 and ends at 1112. The method 1100 may include more or fewer steps or may arrange the order of the steps differently than those shown in FIG. 11. The method 1100 can be executed as a set of computer-executable instructions executed by a computer system and encoded or stored on a computer-readable medium. Further, the method 1100 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 1100 shall be explained with reference to the systems, components, modules, software, data structures, user interfaces, etc., described in conjunction with FIGS. 1-10.

The method 1100 begins at operation 1104, where data in a cache is received. More specifically, an address to data associated with the cache is received. In examples, the data in the cache is within a specific area in memory, such as between a starting and ending address range. In other examples, the entries associated with data in the cache are maintained in a cache table. At 1106, the data in the cache is deduplicated. For example, the data may correspond to a predicted output sequence, a key-value value pair, a target token, target object, target word, and/or target sequence, a probability, or other calculated, predicted, or selected entry. Entries within the cache that include duplicate data are removed. In examples, as the data in the cache is being deduplicated, the cache having deduplicated data is stored at 1108. Alternatively, or in addition, a table associated with each entry in the cache is updated. In examples, the deduplicated data is specific to a layer-specific portion of a cache. For instance, the layer-specific portion of the cache may include a single instance of data regardless of the number of beams utilized by a beam search algorithm. That is, regardless of a beamwidth parameter, the layer-specific portions of the cache may include a single instance of data. The method 1100 ends at 1110.

Figure 12:
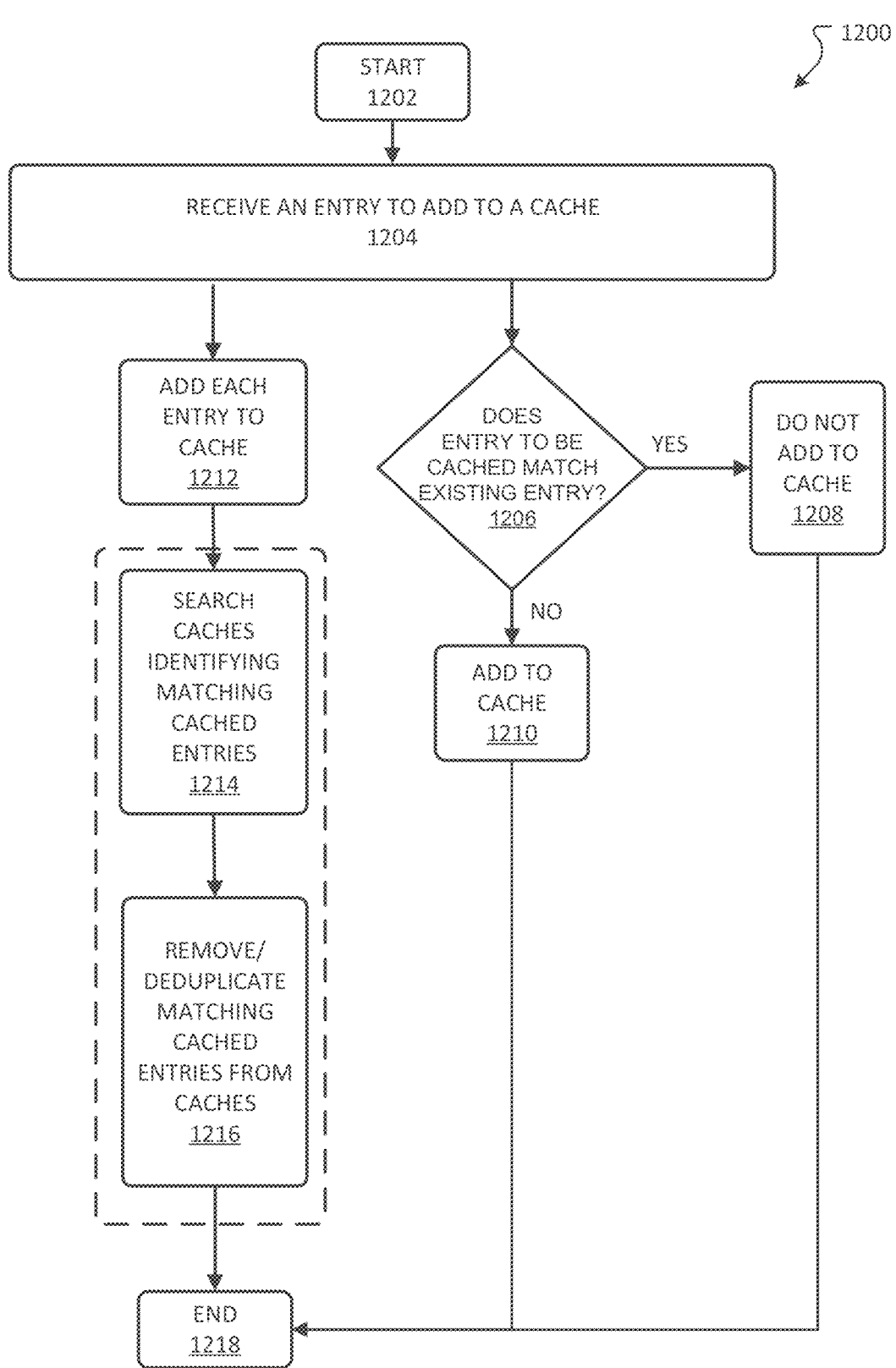
FIG. 12 depicts details of a second method for deduplicating data in a cache in accordance with examples of the present disclosure.

FIG. 12 illustrates an overview of an example method 1200 for providing a deduplicated cache in accordance with examples of the present disclosure. A general order for the steps of the method 1200 is shown in FIG. 12. Generally, the method 1200 starts at 1202 and ends at 1212. The method 1200 may include more or fewer steps or may arrange the order of the steps differently than those shown in FIG. 12. The method 1200 can be executed as a set of computer-executable instructions executed by a computer system and encoded or stored on a computer-readable medium. Further, the method 1200 can be performed by gates or circuits associated with a processor, Application Specific Integrated Circuit (ASIC), a field-programmable gate array (FPGA), a system on chip (SOC), graphics processing unit (GPU), or other hardware device. Hereinafter, the method 1200 shall be explained with reference to the systems, components, modules, software, data structures, user interfaces, etc., described in conjunction with FIGS. 1-11.

The method 1200 begins at 1202 and proceed to 1204. At 1204, an entry is that is to be added to a cache is received. In examples, the entry corresponds to a predicted output sequence, a key-value value pair, a target token, target object, target word, and/or target sequence, a probability, or other calculated, predicted, or selected entry. In some examples, rather than create a beam-specific portion of a cache for each layer and for each network model instantiation, a single beam-specific portion of a cache is created per model layer and referenced by all network model instantiations regardless of beamwidth. That is, traditional beam search methodologies create a beam-specific portion of a cache for each beam; for example, three beam-specific portions of a cache would be created for a beamwidth equal to three. In accordance with examples of the present disclosure, the number of beam-specific portions of the cache that are created is less than the beamwidth.

In examples, the method 1200 proceeds to 1206, where a determination is made as to whether the received entry to be cached matches an existing entry within the cache. For example, where a single beamwidth portion of a cache, receives an entry to be cached, the entry may already exist in the beamwidth portion of the cache. Accordingly, the method 1200 proceeds to 1208 where the entry is not added to the beamwidth portion of the cache. In examples where the entry is unique or otherwise does not exist in the beamwidth portion of the cache, the entry is added to the beamwidth portion of the cache at 1210.

In some examples, multiple beamwidth portions of the cache are consolidated into a single beamwidth portion of the cache. For example, at the conclusion of a times step, between time steps, or in accordance with a cache size or cache limit, multiple beamwidth portions of the cache are consolidated into a single beamwidth portion of the cache. Accordingly, when an entry is added to the beamwidth portion of the cache, the entry is added to one of a plurality of beam specific portions of the cache at 1212. A cache consolidation process includes steps 1214 and steps 1216, where at step 1214, the multiple beam specific portions of the cache are searched to identify matching cached entries. If matching cached entries are identified, one or more entries are deleted. In examples, matching cached entries in a secondary or non-primary beamwidth portion of the cache are deleted; accordingly, one beamwidth portion of the cache is designated as a primary beamwidth portion of the cache and maintains all entries. The method 1200 ends at 1218.

Figure 13:
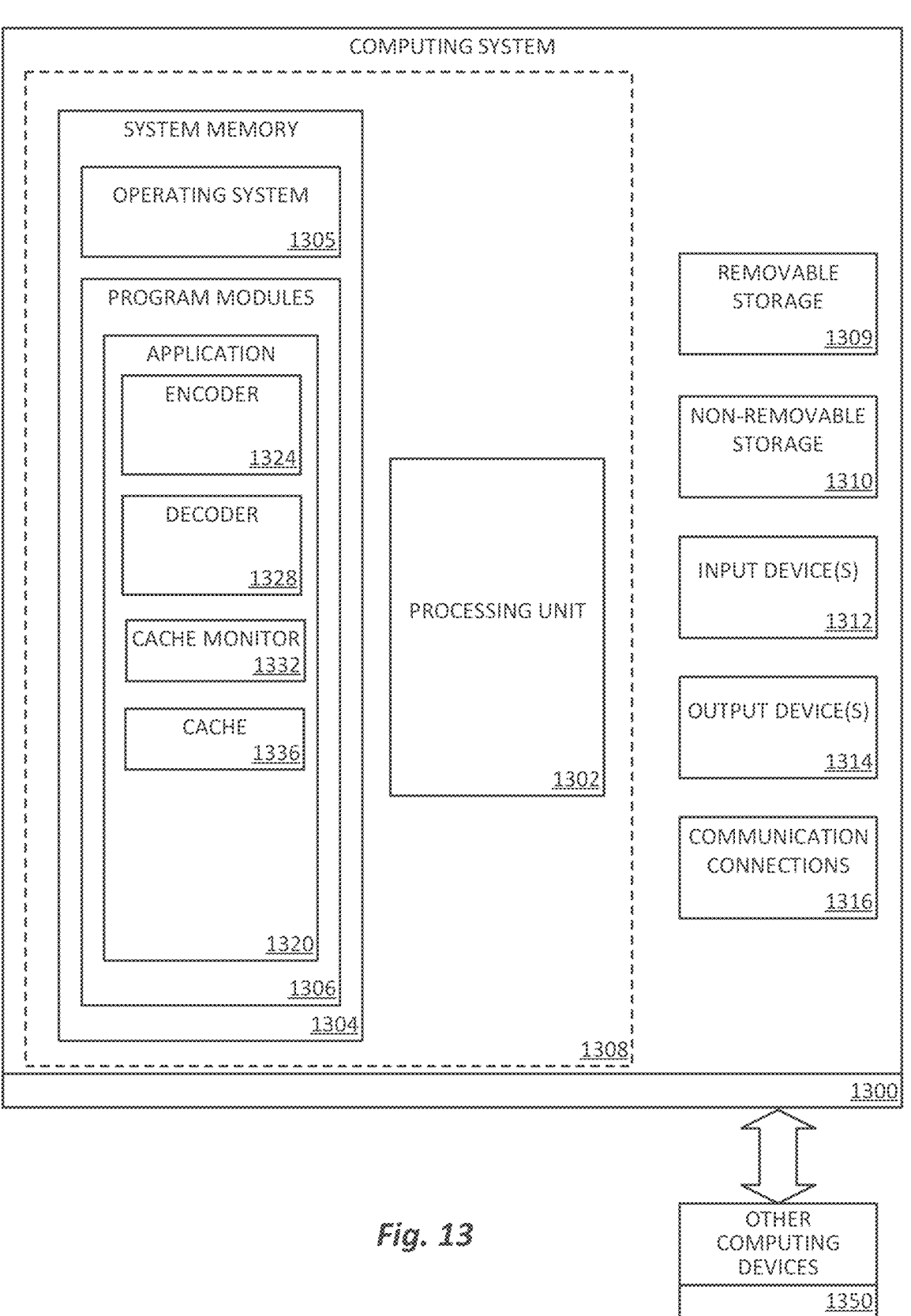
FIG. 13 is a block diagram illustrating physical components (e.g., hardware) of a computing system with which aspects of the disclosure may be practiced.
Figure 14A:
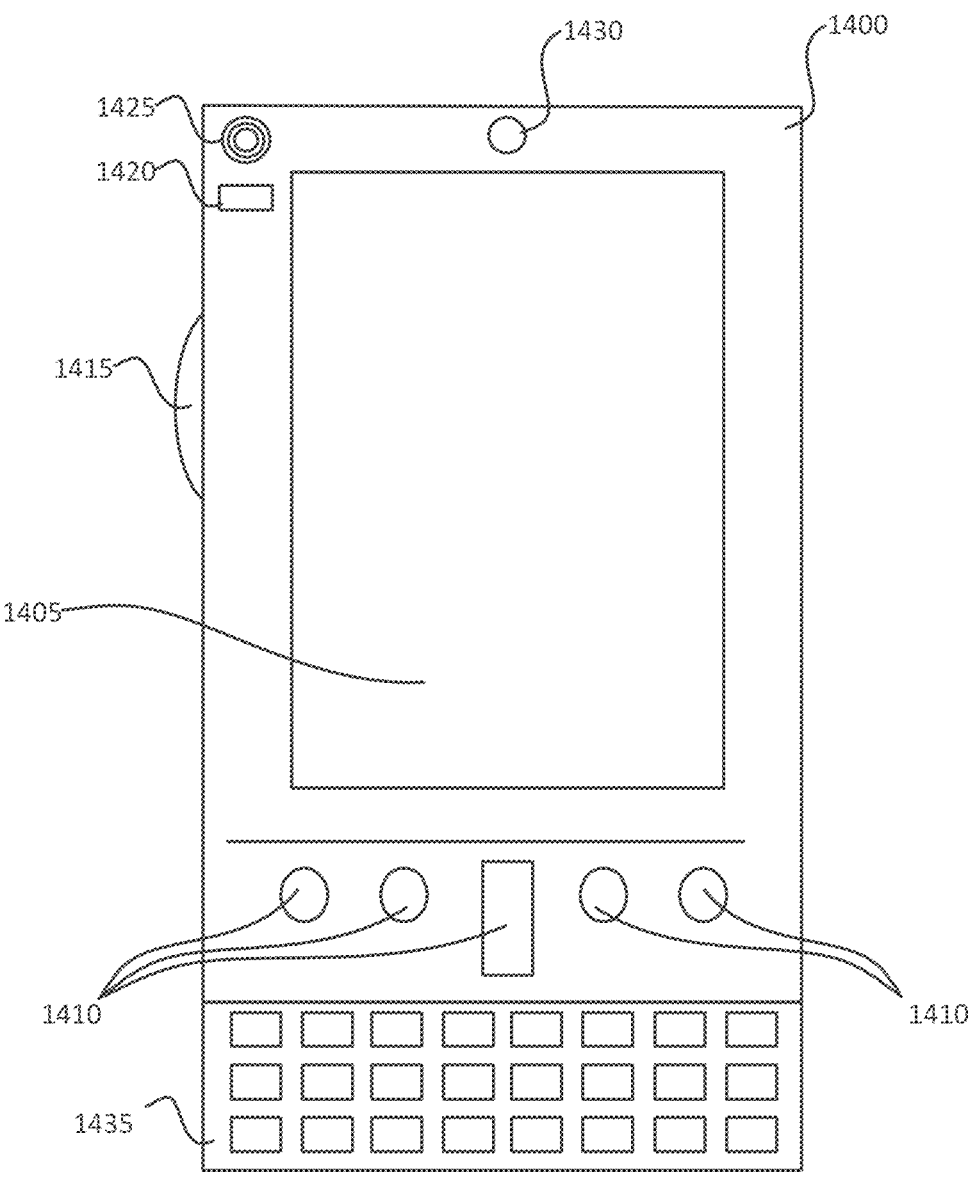
FIGS. 14A-14B illustrate a mobile computing system with which embodiments of the disclosure may be practiced.
Figure 14B:
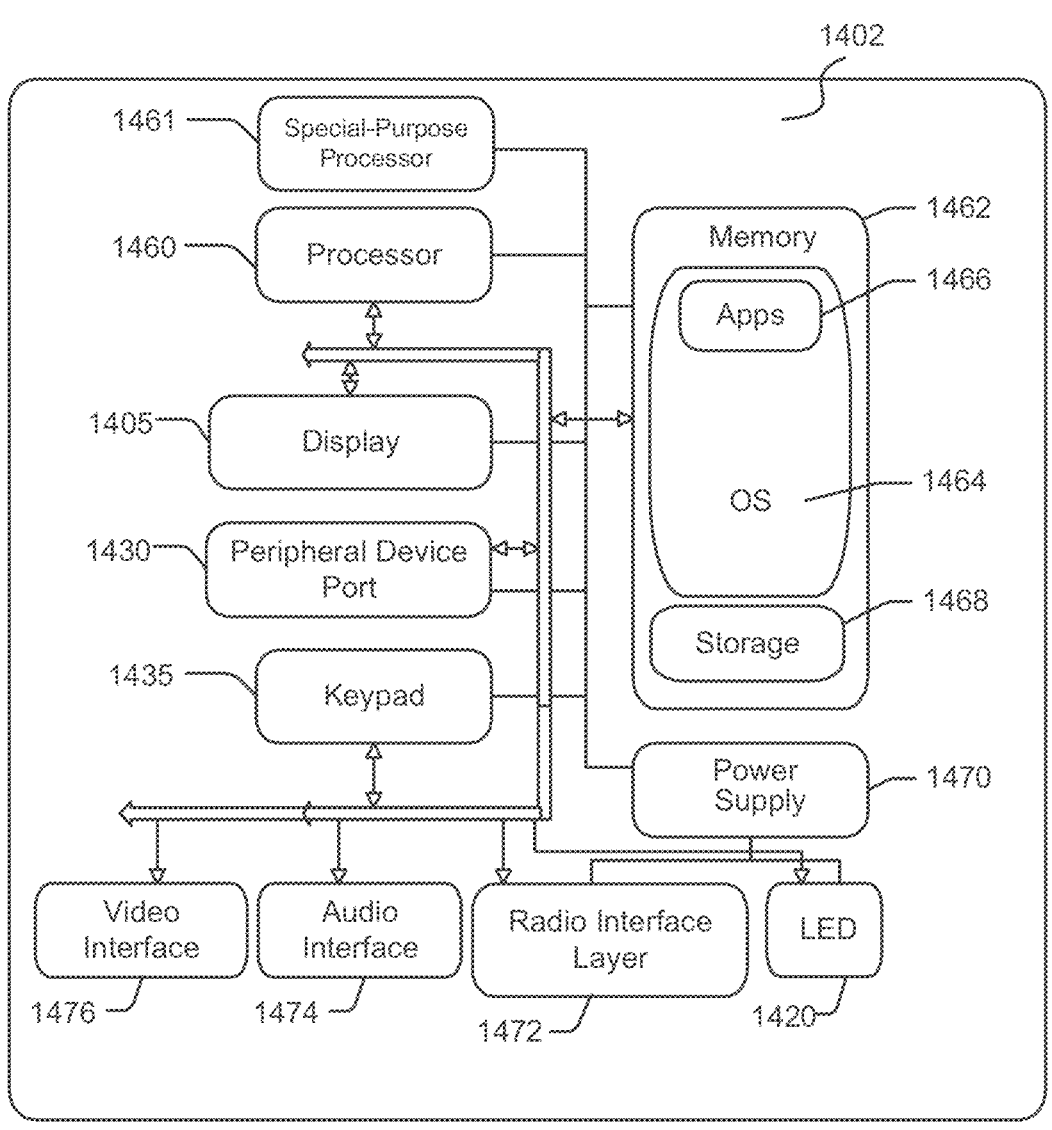
Figure 15:
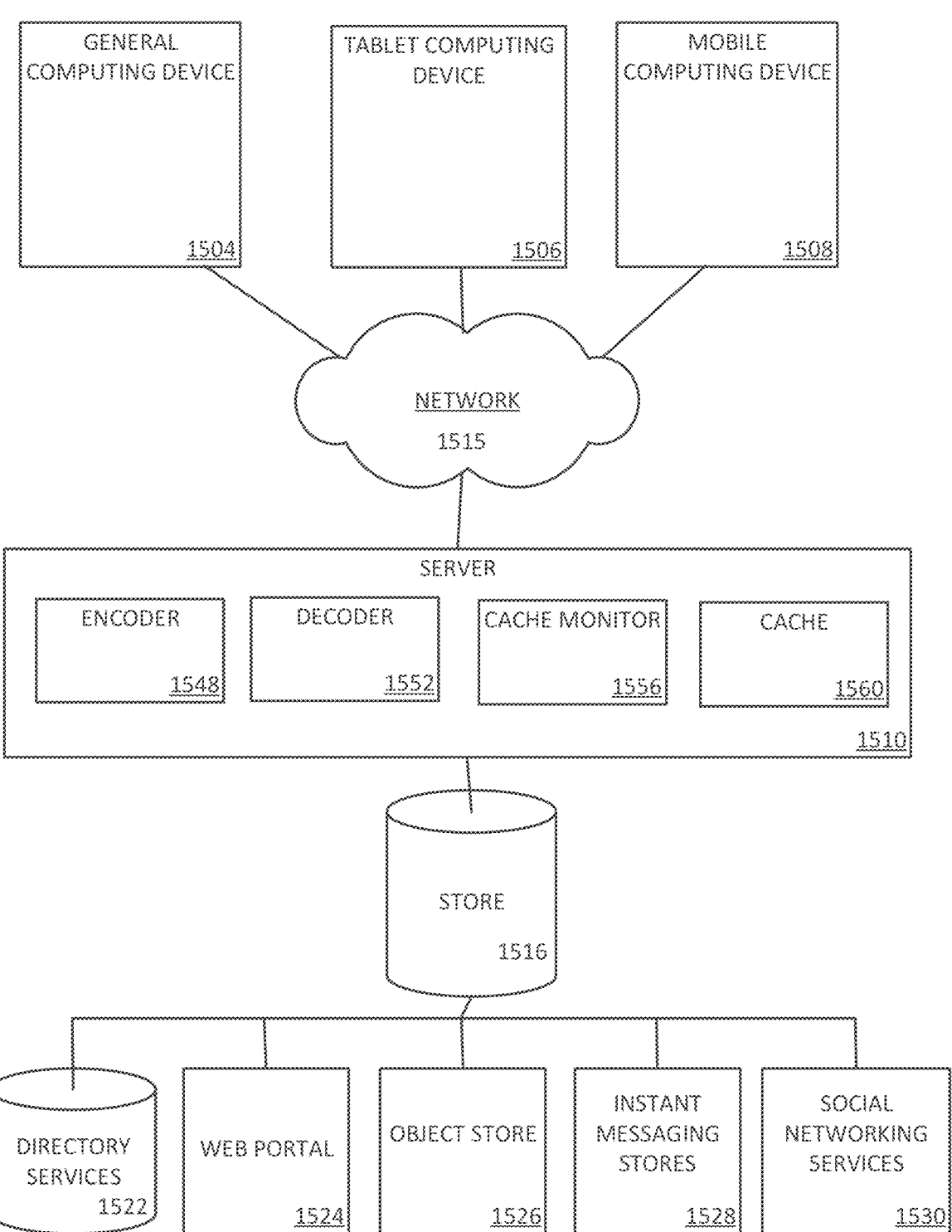
FIG. 15 illustrates one aspect of the architecture of a system for processing data.

FIGS. 13-15 and the associated descriptions provide a discussion of a variety of operating environments in which aspects of the disclosure may be practiced. However, the devices and systems illustrated and discussed with respect to FIGS. 13-15 are for purposes of example and illustration and are not limiting of a vast number of computing system configurations that may be utilized for practicing aspects of the disclosure described herein.

FIG. 13 is a block diagram illustrating physical components (e.g., hardware) of a computing system 1300 with which aspects of the disclosure may be practiced. The computing system components described below may be suitable for the computing and/or processing devices described above. In a basic configuration, the computing system 1300 includes at least one processing unit 1302 and a system memory 1304. Depending on the configuration and type of computing system, the system memory 1304 may comprise, but is not limited to, volatile storage (e.g., random-access memory (RAM)), nonvolatile storage (e.g., read-only memory (ROM)), flash memory, or any combination of such memories.

The system memory 1304 includes an operating system 1305 and one or more program modules 1306 suitable for running software application 1320, such as one or more components supported by the systems described herein. As an example, system memory 1304 includes the encoder 1324, the decoder 1328, a cache monitor 1332, and the cache 1336. The encoder 1324 may be the same as or similar to the encoder 113, 308, 512, and/or 612 as previously described. The decoder 1328 may be the same as or similar to the decoder 120, 314, 552, or 652 as previously described. The cache 1336 may be same as or similar to the cache 524, 544, 620, 640, and/or 644 as previously described. The operating system 1305, for example, may be suitable for controlling the operation of the computing system 1300.

Furthermore, embodiments of the disclosure may be practiced in conjunction with a graphics library, other operating systems, or any other application program and are not limited to any particular application or system. This basic configuration is illustrated in FIG. 13 by those components within a dashed line 1308. The computing system 1300 may have additional features or functionality. For example, the computing system 1300 includes additional data storage devices (removable and/or non-removable) such as, for example, magnetic disks, optical disks, or tape. Such additional storage is illustrated in FIG. 13 by a removable storage device 2909 and a non-removable storage device 1310.

As stated above, a number of program modules and data files are stored in the system memory 1304. While executing on the processing unit 1302, the program modules 1306 (e.g., encoder 1324, decoder 1328, cache monitor 1332) perform processes including, but not limited to, the aspects as described herein. Other program modules that may be used in accordance with aspects of the present disclosure include electronic mail and contacts applications, word processing applications, spreadsheet applications, database applications, slide presentation applications, drawing or computer-aided programs, etc.

Furthermore, embodiments of the disclosure may be practiced in an electrical circuit discrete electronic element, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 13 are integrated onto a single integrated circuit. Such an SOC device may include one or more processing units, graphics units, communications units, system virtualization units and various application functionality, all of which are integrated (or "burned") onto the chip substrate as a single integrated circuit. When operating via an SOC, the functionality, described herein, with respect to the capability of client to switch protocols is operated via application-specific logic integrated with other components of the computing system 1300 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure are practiced within a general-purpose computer or in any other circuits or systems.

The computing system 1300 can include or more input device(s) 1312 such as a keyboard, a mouse, a pen, a sound or voice input device, a touch or swipe input device, etc. The output device(s) 1314 such as a display, speakers, a printer, etc. may also be included. The aforementioned devices are examples and others may be used. The computing system 1300 may include one or more communication connections 1316, allowing communications with other computing systems 1350. Examples of suitable communication connections 916 include, but are not limited to, radio frequency (RF) transmitter, receiver, and/or transceiver circuitry; universal serial bus (USB), parallel, and/or serial ports.

The term computer-readable media as used herein includes computer storage media.

Computer storage media may include volatile and nonvolatile, removable, and non-removable media implemented in any method or technology to store information, such as computer-readable instructions, data structures, or program modules. The system memory 1304, the removable storage device 1309, and the non-removable storage device 1310 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing system 1300. Any such computer storage media may be part of the computing system 1300. Computer storage media does not include a carrier wave or other propagated or modulated data signal.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 14A-14B illustrate a mobile computing system 1400, for example, a mobile telephone, a smartphone, wearable computer (such as a smartwatch), a tablet computer, a laptop computer, and the like, with which embodiments of the disclosure may be practiced. In some respects, the client is a mobile computing system. With reference to FIG. 14A, one aspect of a mobile computing system 1400 for implementing the aspects is illustrated. In a basic configuration, the mobile computing system 1400 is a handheld computer having both input elements and output elements. The mobile computing system 1400 typically includes a display 1405 and one or more input buttons 1410 that allow the user to enter information into the mobile computing system 1400. The display 1405 of the mobile computing system 1400 may also function as an input device (e.g., a touch screen display).

If included, an optional side input element 1415 allows further user input. The side input element 1415 may be a rotary switch, a button, or any other type of manual input element. In alternative aspects, mobile computing system 1400 may incorporate greater or fewer input elements. For example, the display 1405 is not a touch screen in some embodiments.

In yet another alternative embodiment, the mobile computing system 1400 is a portable phone system, such as a cellular phone. The mobile computing system 1400 may also include an optional keypad 1435. Optional keypad 1435 is a physical keypad or a "soft" keypad generated on the touch screen display.

In various embodiments, the output elements include the display 1405 for showing a graphical user interface (GUI), a visual indicator 1420 (e.g., a light-emitting diode), and/or an audio transducer 1425 (e.g., a speaker). In some aspects, the mobile computing system 1400 incorporates a vibration transducer for providing the user with tactile feedback. In yet another aspect, the mobile computing system 1400 incorporates input and/or output ports, such as an audio input (e.g., a microphone jack), an audio output (e.g., a headphone jack), and a video output (e.g., an HDMI port) for sending signals to or receiving signals from an external device.

FIG. 14B is a block diagram illustrating the architecture of one aspect of a mobile computing system. That is, the mobile computing system 1400 can incorporate a system (e.g., an architecture) 1402 to implement some aspects. In one embodiment, the system 1402 is implemented as a "smartphone" capable of running one or more applications (e.g., browser, e-mail, calendaring, contact managers, messaging clients, games, and media clients/players). In some aspects, the system 1402 is integrated as a computing system, such as an integrated personal digital assistant (PDA) and wireless phone.

One or more application programs 1466 are loaded into the memory 1462 and run on or in association with the operating system 1464. Examples of the application programs include phone dialer programs, e-mail programs, personal information management (PIM) programs, word processing programs, spreadsheet programs, Internet browser programs, messaging programs, and so forth. The system 1402 also includes a nonvolatile storage area 1468 within the memory 1462. The nonvolatile storage area 1468 is used to store persistent information that should not be lost if the system 1402 is powered down. The application programs 1466 uses and stores information in the nonvolatile storage area 1468, such as e-mail or other messages used by an e-mail application, and the like. A synchronization application (not shown) also resides on the system 1402 and is programmed to interact with a corresponding synchronization application resident on a host computer to keep the information stored in the nonvolatile storage area 1468 synchronized with corresponding information stored at the host computer. As should be appreciated, other applications are loaded into the memory 1462 and run on the mobile computing system 1400 described herein (e.g., search engine, extractor module, relevancy ranking module, answer scoring module, etc.).

The system 1402 has a power supply 1470, which is implemented as one or more batteries. The power supply 1470 might further include an external power source, such as an AC adapter or a powered docking cradle that supplements or recharges the batteries.

The system 1402 also includes a radio interface layer 1472 that performs the function of transmitting and receiving radio frequency communications. The radio interface layer 1472 facilitates wireless connectivity between the system 1402 and the "outside world," via a communications carrier or service provider. Transmissions to and from the radio interface layer 1472 are conducted under control of the operating system 1464. In other words, communications received by the radio interface layer 1472 are disseminated to the application programs 1466 via the operating system 1464, and vice versa.

The visual indicator 1420 is used to provide visual notifications, and/or an audio interface 1474 is used for producing audible notifications via the audio transducer 1425. In the illustrated embodiment, the visual indicator 1420 is a light-emitting diode (LED), and the audio transducer 1425 is a speaker. These devices may be directly coupled to the power supply 1470 so that when activated, they remain on for a duration dictated by the notification mechanism even though the processor 1460, a special purpose processor 1461, and other components might shut down for conserving battery power. The LED may be programmed to remain on indefinitely until the user takes action to indicate the powered-on status of the device. The audio interface 1474 is used to provide audible signals to and receive audible signals from the user. For example, in addition to being coupled to the audio transducer 1425, the audio interface 1474 may also be coupled to a microphone to receive audible input, such as to facilitate a telephone conversation. In accordance with embodiments of the present disclosure, the microphone may also serve as an audio sensor to facilitate control of notifications, as will be described below. The system 1402 may further include a video interface 1476 that enables an operation of an on-board camera 1430 to record still images, video stream, and the like.

A mobile computing system 1400 implementing the system 1402 includes additional features or functionality. For example, the mobile computing system 1400 may also include additional data storage devices (removable and/or non-removable) such as, magnetic disks, optical disks, or tape. Such additional storage is illustrated in FIG. 14B by the nonvolatile storage area 1468.

Data/information generated or captured by the mobile computing system 1400 and stored via the system 1402 is stored locally on the mobile computing system 1400, as described above, or the data is stored on any number of storage media that may be accessed by the device via the radio interface layer 1472 or via a wired connection between the mobile computing system 1400 and a separate computing system associated with the mobile computing system 1400, for example, a server computer in a distributed computing network, such as the Internet. As should be appreciated, such data/information can be accessed via the mobile computing system 1400 via the radio interface layer 1472 or via a distributed computing network. Similarly, such data/information may be readily transferred between computing systems for storage and use according to well-known data/information transfer and storage means, including electronic mail and collaborative data/information sharing systems.

FIG. 15 illustrates one aspect of the architecture of a system for processing data received at a computing system from a remote source, such as a personal computer 1504, tablet computing system 1506, or mobile computing system 1508, as described above. Content at a server device 1510 is stored in different communication channels or other storage types. For example, various documents are stored using a directory service 1522, a web portal 1524, a mailbox service 1526, an instant messaging store 1528, or a social networking site 1530.

One or more of the previously described program modules 1306 or software applications 1320 are employed by server device 1510 and/or the personal computer 1504, tablet computing system 1506, or mobile computing system 1508, as described above. For example, the server device 1510 includes an encoder 1548, a decoder 1552, a cache monitor 1556, and/or a cache 1560, and/or a service 1520. The encoder 1548 may be the same as or similar to the encoder 112, 308, 512, 612, and/or 1324 as previously described. The decoder 1552 may be the same as or similar to the decoder 120, 314, 552, 652, and/or 1328 as previously described. The cache 1560 may be same as or similar to the cache 524, 544, 620, 640, 644, and/or 1336 as previously described. The cache monitor 1556 may be the same as or similar to the cache monitor 1332 as previously described.

The server device 1510 provides data to and from a client computing system such as a personal computer 1504, a tablet computing system 1506 and/or a mobile computing system 1508 (e.g., a smart phone) through a network 1515.

By way of example, the computer system described above is embodied in a personal computer 1504, a tablet computing system 1506 and/or a mobile computing system 1508 (e.g., a smartphone). Any of these embodiments of the computing systems obtain content from the store 1516, in addition to receiving graphical data useable to be either pre-processed at a graphic-originating system, or post-processed at a receiving computing system.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing system displays or via remote display units associated with one or more computing systems. For example, user interfaces and information of various types may be displayed and interacted with on a wall surface onto which user interfaces and information of various types are projected. Interaction with the multitude of computing systems with which embodiments of the invention may be practiced includes keystroke entry, touch screen entry, voice or other audio entry, gesture entry where an associated computing system is equipped with detection (e.g., camera) functionality for capturing and interpreting user gestures for controlling the functionality of the computing system, and the like.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently, or the blocks may sometimes be executed in the reverse order, depending upon the functionality/acts involved.

The present disclosure relates to systems and methods for dynamically modifying a cache associated with a neural network model of a natural language generator according to at least the examples provided in the sections below:

(A1) In one aspect, some embodiments include a method of dynamically modifying a cache associated with a neural network. The method is performed at a decoder (e.g., 652) of a neural network model (e.g., 501/601) of a natural language generator (e.g., FIG. 1). The method includes: (i) determining (e.g., 1004) that an amount of memory utilized by the cache (e.g., 644) of a neural network model (e.g., 601) exceeds a threshold memory size; (ii) identifying (e.g., 1008) a layer-specific portion (e.g., 648C) of the cache (e.g., 644) associated with a layer (e.g., 654C) of the neural network model (e.g., 601); (iii) modifying the cache (e.g., 644) by repurposing and discarding data stored in the identified layer-specific portion (e.g., 648C) of the cache (e.g., 644) when the amount of memory utilized by the cache (e.g., 644) of the neural network model (e.g., 601) exceeds the threshold memory size; and (iv) decoding an encoded input (e.g., 616) of a natural language generator utilizing a beam search (e.g., 200) algorithm using the modified cache (e.g., 644).

(A2) In some embodiments of A1, the method further includes: determining (e.g., 1016) that the amount of memory utilized by the modified cache (e.g., 644) of the neural network model (e.g., 601) is less than the threshold memory size; identifying (e.g., 1018) a layer (e.g., 654C) of the neural network model (e.g., 601) that is not associated with data in the modified cache (e.g., 644); and generating (e.g., 1020) data for the identified layer (e.g., 654C), wherein the generated data is stored in a layer-specific portion (e.g., 648C) of the modified cache (e.g., 644) that is associated with the identified layer (e.g., 654C).

(A3) In some embodiments of A1-A2, generating (e.g., 1020) data for the identified layer (e.g., 654C) includes deduplicating data stored in the layer-specific portion (e.g., 548C) of the modified cache (e.g., 644) that is associated with the identified layer (e.g., 654C).

(A4) In some embodiments of A1-A3, the method further includes: generating output candidates (e.g., 658) utilizing the data stored in a layer-specific portion (e.g., 648C) of the modified cache (e.g., 644) that is associated with the identified layer (e.g., 654C).

(A5) In some embodiments of A1-A4, repurposing and discarding data stored in the identified layer-specific portion (e.g., 648C) of the cache (e.g., 644) includes deduplicating data stored in the layer-specific portion (e.g., 548C) of the cache (e.g., 644).

(A6) In some embodiments of A1-A5, the method further includes: receiving data associated with an entry in the layer-specific portion (e.g., 648C) of the cache (e.g., 644) for a first beam in the beam search algorithm (e.g., 200); generating a first output candidate (e.g., 658) utilizing the entry in the layer-specific portion (e.g., 648C) of the cache (e.g., 644); receiving the data associated with the entry in the layer-specific portion (e.g., 648C) of the cache (e.g., 644) for a second beam in the beam search algorithm (e.g., 200); and generating a second output candidate (e.g., 658) utilizing the entry in the layer-specific portion (e.g., 648C) of the cache (e.g., 644).

(A7) In some embodiments of A1-A6, a number of beam-specific portions (e.g., 548) of the cache (e.g., 544) that are associated with a layer (e.g., 550A) of the neural network model (e.g., 501) is less than a beamwidth employed by the beam search algorithm (e.g., 200).

(A8) In some embodiments of A1-A7, the identified (e.g., 1008) layer-specific portion (e.g., 648C) of the cache (e.g., 644) is associated with a lowest layer (e.g., 654C) of the neural network model (e.g., 601).

In yet another aspect, some embodiments include a computing system including one or more processors and memory coupled to the one or more processors, the memory storing one or more programs configured to be executed by the one or more processors, the one or more programs including instructions for performing any of the methods described herein (e.g., A1-A8 described above).

In yet another aspect, some embodiments include a non-transitory computer-readable storage medium storing one or more programs for execution by one or more processors of a storage device, the one or more programs including instructions for performing any of the methods described herein (e.g., A1-A8 described above).

The present disclosure relates to systems and methods for generating output candidates using a beam search algorithm and utilizing a neural network model of a natural language generator according to at least the examples provided in the sections below:

(B1) In one aspect, some embodiments include a method for generating output candidates using a beam search algorithm. The method is performed at a decoder (e.g., 552) of a neural network model (e.g., 501/601) of a natural language generator (e.g., FIG. 1). The method includes: (i) receiving (e.g., 804) an input (e.g., 508) at an encoder (e.g., 512) of a neural network model (e.g., 501); (ii) encoding (e.g., 806) the input (e.g., 508) at the encoder (e.g., 512) of the neural network model (e.g., 501); and (iii) generating (e.g., 810) output candidates (e.g., 556) using a decoder (e.g., 552) of the neural network model (e.g., 501) to decode the encoded input (e.g., 520) utilizing a layer-specific portion (e.g., 548A) of a cache (e.g., 544) that includes deduplicated data, wherein the decoder (e.g., 552): receives data associated with an entry in a layer-specific portion (e.g., 548A) of the cache (e.g., 544) for a first beam in the beam search algorithm (e.g., 200); generates a first output candidate (e.g., 558) utilizing the entry in the layer-specific portion (e.g., 548A) of the cache (e.g., 544); receives the data associated with the entry in the layer-specific portion (e.g., 548A) of the cache (e.g., 544) for a second beam in the beam search algorithm (e.g., 200); and generates a second output candidate (e.g., 558) utilizing the entry in the layer-specific portion (e.g., 548A) of the cache (e.g., 544).

(B2) In some embodiments of B1, a number of beam-specific portions of the cache for a layer (e.g., 550A) of the neural network model (e.g, 501) is less than a beamwidth parameter used by the beam search algorithm (e.g., 200).

(B3) In some embodiments of B1-B2, the method further includes: determining (e.g., 1016) that an amount of memory utilized by a cache (e.g., 548/648) of the neural network model (e.g., 501/601) is less than a threshold memory size; identifying (e.g., 1018) a layer (e.g., 550C) of the neural network model (e.g., 601) that is not associated with data in the cache (e.g., 544); and generating data for the identified layer (e.g., 550C), wherein the generated data is stored in a layer-specific portion (e.g., 648C) of the cache (e.g., 644) that is associated with the identified layer (e.g., 550C).

(B4) In some embodiments of B1-B3, the method further includes: determining (e.g., 1004) that an amount of memory utilized by a cache (e.g., 548/648) of the neural network model (e.g., 501/601) exceeds a threshold memory size; identifying (e.g., 1008) a layer-specific portion of the cache (e.g., 648C); and modifying the cache (e.g., 644) by repurposing and discarding data stored in the identified layer-specific portion (e.g., 648C) of the cache (e.g., 644) when the amount of memory utilized by the cache (e.g., 644) of the neural network model (e.g., 501/601) exceeds the threshold memory size.

(B5) In some embodiments of B1-B4, repurposing and discarding data stored in the identified layer-specific portion (e.g., 648C) of the cache (e.g., 644) includes deduplicating data stored in the layer-specific portion (e.g., 648C) of the cache (e.g., 644).

(B6) In some embodiments of B1-B5, the identified (e.g., 1008) layer-specific portion (e.g., 548C) of the cache (e.g., 544) is associated with a lowest layer (e.g., 554C) of the neural network model (e.g., 601).

The description and illustration of one or more aspects provided in this application are not intended to limit or restrict the scope of the disclosure as claimed in any way. The aspects, examples, and details provided in this application are considered sufficient to convey possession and enable others to make and use the best mode of the claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
   a cache including a plurality of layer-specific caches storing encoded inputs generated by an encoder of a neural network model, the encoded inputs used by a decoder of the neural network model to generate output candidates, wherein the decoder includes a plurality of layers, where a first layer-specific cache of the plurality of layer-specific caches corresponds to a first layer of the plurality of layers of the decoder;
   a processor; and
   memory, including instructions that, as a result of being executed by the processor, cause the processor to:
     determine that an amount of memory utilized by the cache exceeds a threshold memory size, wherein the amount of memory allocated to the cache is determined based on batch input processing and the plurality of layer-specific caches;
     determine the first layer-specific cache includes a first portion of the encoded inputs that are not associated with another operation of the decoder;
     modify the cache by discarding the first portion of the encoded inputs stored in the first layer-specific cache such that the cache is resized based on discarding the first portion of the encoded inputs; and
     decode a second portion of the encoded inputs utilizing a beam search algorithm using the cache.

2. The system of claim 1, further comprising instructions, that, as a result of being executed by the processor, cause the processor to:
   determine that the amount of memory utilized by the cache is less than the threshold memory size;
   determine a second layer of the plurality of layers of the decoder that is not associated with data in the cache; and
   generate additional data for the second layer, wherein the additional data is stored in a second layer-specific cache of the plurality of layer-specific caches corresponding to the second layer.

3. The system of claim 2, wherein the additional data is generated by deduplicating data stored in the second layer-specific cache.

4. The system of claim 1, wherein discarding the first portion of the encoded inputs further comprises deduplicating data stored in the first layer-specific cache.

5. The system of claim 4, further comprising instructions, that, as a result of being executed by the processor, cause the processor to:
   receive data associated with an entry in the first layer-specific cache for a first beam in the beam search algorithm; and
   cause the first layer to generate a first output candidate utilizing the entry.

6. The system of claim 4, wherein a number of beam-specific portions of the cache that are associated with layers of the plurality of layers is less than a beamwidth employed by the beam search algorithm.

7. The system of claim 1, wherein the first layer-specific cache is associated with a lowest layer of the decoder.

8. A method comprising:
   receiving an input at an encoder of a neural network model;
   encoding the input at the encoder of the neural network model to generate an encoded input;

causing a decoder of the neural network model to generate output candidates based on the encoded input, wherein the decoder includes a plurality of layers utilizing a plurality of layer-specific caches of a cache that stores the encoded input;

obtaining a first data associated with an entry in a first layer-specific cache for a first beam in a beam search algorithm;

modifying the first layer-specific cache by discarding a second data stored in the first layer-specific cache as a result of an amount of memory utilized by the cache exceeding a threshold memory size, wherein the cache is dynamically resized as a result of discarding a second data stored in the first layer-specific cache;

causing a first layer of the decoder to generate a first output candidate based on the entry in the first layer-specific cache;

obtaining a second data associated with the entry in the first layer-specific cache for a second beam in the beam search algorithm; and causing a first layer of the decoder to generate a second output candidate utilizing the entry in the first layer-specific cache.

9. The method of claim 8, wherein a number of beam-specific portions of the cache is less than a beamwidth parameter used by the beam search algorithm.

10. The method of claim 8, further comprising:

determining that the amount of memory utilized by the cache is less than a threshold memory size;

identifying a layer of the decoder that is not associated with data stored in the cache; and generating a third data for the layer, wherein the third data is stored in a third layer-specific cache that is associated with the layer of the decoder.

11. The method of claim 8, wherein discarding the second data stored further comprises deduplicating data stored in the first layer-specific cache.

12. The method of claim 8, wherein the first layer-specific cache is associated with a lowest layer of the neural network model.

13. A system comprising:

a cache including a first layer-specific cache storing encoded inputs generated by an encoder of a neural network model, the encoded inputs used by a decoder of the neural network model to generate output candidates, wherein the decoder includes a plurality of layers, where the first layer-specific cache corresponds to a first layer of the plurality of layers of the decoder and an amount of memory allocated to the cache is determined based on a tradeoff between memory allocated for batch input processing and memory allocated for caching layer-specific data;

a processor; and memory including instructions that, as a result of being executed by the processor, cause the processor to:

receive an input at the encoder of the neural network model;

cause the encoder to encode the input to generate an encoded input; and cause the decoder to generate output candidates based on the encoded input stored in the first layer-specific cache, where the first layer-specific cache includes deduplicated data, wherein the decoder generates the output candidates by:

obtaining data associated with an entry in the first layer-specific cache for a first beam in a beam search algorithm;

generating a first output candidate utilizing the entry in the first layer-specific cache;

modifying the cache by discarding a first portion of data stored in the first layer-specific cache in response to an amount of memory utilized by the cache exceeding a threshold memory size;

obtaining additional data associated with the entry for a second beam in the beam search algorithm; and generating a second output candidate utilizing the entry.

14. The system of claim 13, wherein a number of beams of the beam search algorithm is less than a beamwidth parameter used by the beam search algorithm.

15. The system of claim 13, further comprising instructions, that, as a result of being executed by the processor, cause the processor to:

determine that the amount of memory utilized by the cache is less than a threshold memory size;

identify a second layer of the decoder that is not associated with data in the cache; and generates second data for the second layer, wherein the second data is stored in a second layer-specific cache that is associated with the second layer.

16. The system of claim 13, wherein discarding the first portion of data includes deduplicating data stored in the first layer-specific cache.

17. The system of claim 13, wherein the first layer-specific cache is associated with a lowest layer of the decoder.

18. The system of claim 1, wherein the first portion of the encoded inputs that are not associated with another operation of the decoder are determined based at least in part on a flag indicating that data in the first layer-specific cache is not needed.

19. The method of claim 8, wherein discarding the second data is based on a flag indicating that the second data in the first layer-specific cache is not needed for an operation of the decoder.

20. The system of claim 13, wherein discarding the first portion of data is based on a flag indicating that data in the first layer-specific cache is not needed.

* * * * *